United States Patent
Stevens

(10) Patent No.: US 10,703,427 B2
(45) Date of Patent: Jul. 7, 2020

(54) VEHICLE LATCH MECHANISM JIG

(71) Applicant: Nissan North America, Inc., Franklin, TN (US)

(72) Inventor: Shannon Leigh Stevens, Smyrna, TN (US)

(73) Assignee: Nissan North America, Inc., Franklin, TN (US)

( * ) Notice: Subject to any disclaimer, the term of this patent is extended or adjusted under 35 U.S.C. 154(b) by 57 days.

(21) Appl. No.: 15/937,576

(22) Filed: Mar. 27, 2018

(65) Prior Publication Data
US 2019/0300079 A1    Oct. 3, 2019

(51) Int. Cl.
*B62D 65/02* (2006.01)
*B25B 11/02* (2006.01)
*E05B 83/24* (2014.01)

(52) U.S. Cl.
CPC ............ *B62D 65/026* (2013.01); *B25B 11/02* (2013.01); *E05B 83/24* (2013.01)

(58) Field of Classification Search
CPC ........ B62D 65/026; B25B 11/02; E05B 83/24
See application file for complete search history.

(56) References Cited

U.S. PATENT DOCUMENTS

| | | | |
|---|---|---|---|
| 2,697,625 A * | 12/1954 | Krause | ................. E05C 19/007 |
| | | | 292/64 |
| 7,028,379 B2 | 4/2006 | Park | |
| 9,694,864 B2 | 7/2017 | Hur | |
| 2018/0298652 A1 * | 10/2018 | Kozaki | ................. E05B 83/243 |

FOREIGN PATENT DOCUMENTS

| | | |
|---|---|---|
| CN | 206588528 U | 10/2017 |
| JP | 3752899 B2 | 3/2006 |

* cited by examiner

*Primary Examiner* — John C Hong
(74) *Attorney, Agent, or Firm* — Global IP Counselors, LLP

(57) ABSTRACT

A jig has a frame, a carrier and a hood latch supporting assembly. The frame has two first shafts and a bracket attachment portion. The carrier has two sliders and a second shaft. The two sliders are fitted to the first shafts for movement in a Z-direction along the first shafts. The second shaft is perpendicular to the first shafts. The two sliders and the second shaft are rigidly fixed to one another. The hood latch supporting assembly has a second slider and a latch support portion. The second slider is fitted to the second shaft for movement in an X-axis direction along the second shaft. The latch support portion is coupled to the second slider for movement therewith. The frame assembly allows movement of a latch mechanism loosely fitted to a bracket during alignment of the latch mechanism to the bracket.

17 Claims, 19 Drawing Sheets

VEHICLE LATCH MECHANISM JIG

BACKGROUND

Field of the Invention

The present invention generally relates to a vehicle latch mechanism jig. More specifically, the present invention relates to a vehicle latch mechanism jig that simplifies a process for aligning a latch mechanism of a vehicle with a latch striker that is fixed to the hood of a vehicle.

Background Information

Vehicles with hoods covering an engine compartment typically include a latch striker fixed to the hood, and a latch mechanism fixed to structures at the front of the vehicle. During the vehicle assembly process, one of the latch mechanism and the latch striker must be aligned with the other to ensure smooth opening and closing of the hood of the vehicle.

SUMMARY

One object of the present disclosure is to simplify an alignment procedure in which a latch mechanism is aligned with a latch striker.

Another object of the present disclosure is to provide a jig with structures that first, temporarily attach a first portion of the jig to a bracket that supports a latch mechanism; second, temporarily attach another portion of the jig to the latch mechanism; three, allow the latch mechanism to move into an aligned orientation with a latch striker; and four, be easily removed from the latch mechanism and the bracket after fixedly securing the latch mechanism to the bracket.

In view of the state of the known technology, one aspect of the present disclosure is to provide a vehicle latch mechanism jig with a frame assembly, a carrier assembly and a hood latch supporting assembly. The frame assembly has at least one first shaft and a vehicle bracket attachment portion. The carrier assembly has at least one slider and a second shaft. The at least one slider is fitted to the at least one first shaft for movement in a Z-direction along the at least one first shaft. The slider member includes a second shaft perpendicular to the at least one first shaft, and the slider member and the second shaft are rigidly fixed to one another. The hood latch supporting assembly has a slider member, an elongated extension member and a latch support portion. The slider member is fitted to the second shaft for movement in an X-axis direction along the second shaft. The first end of the elongated extension member is rigidly fixed to the slider member. The latch support portion is located at a second end of the elongated extension member. Further, the frame assembly is configured such that with the vehicle bracket attachment portion removably attached to a vehicle bracket, the latch support portion attaches to a hood latch mechanism that is loosely fitted to the vehicle bracket during alignment of the hood latch mechanism to the vehicle bracket.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
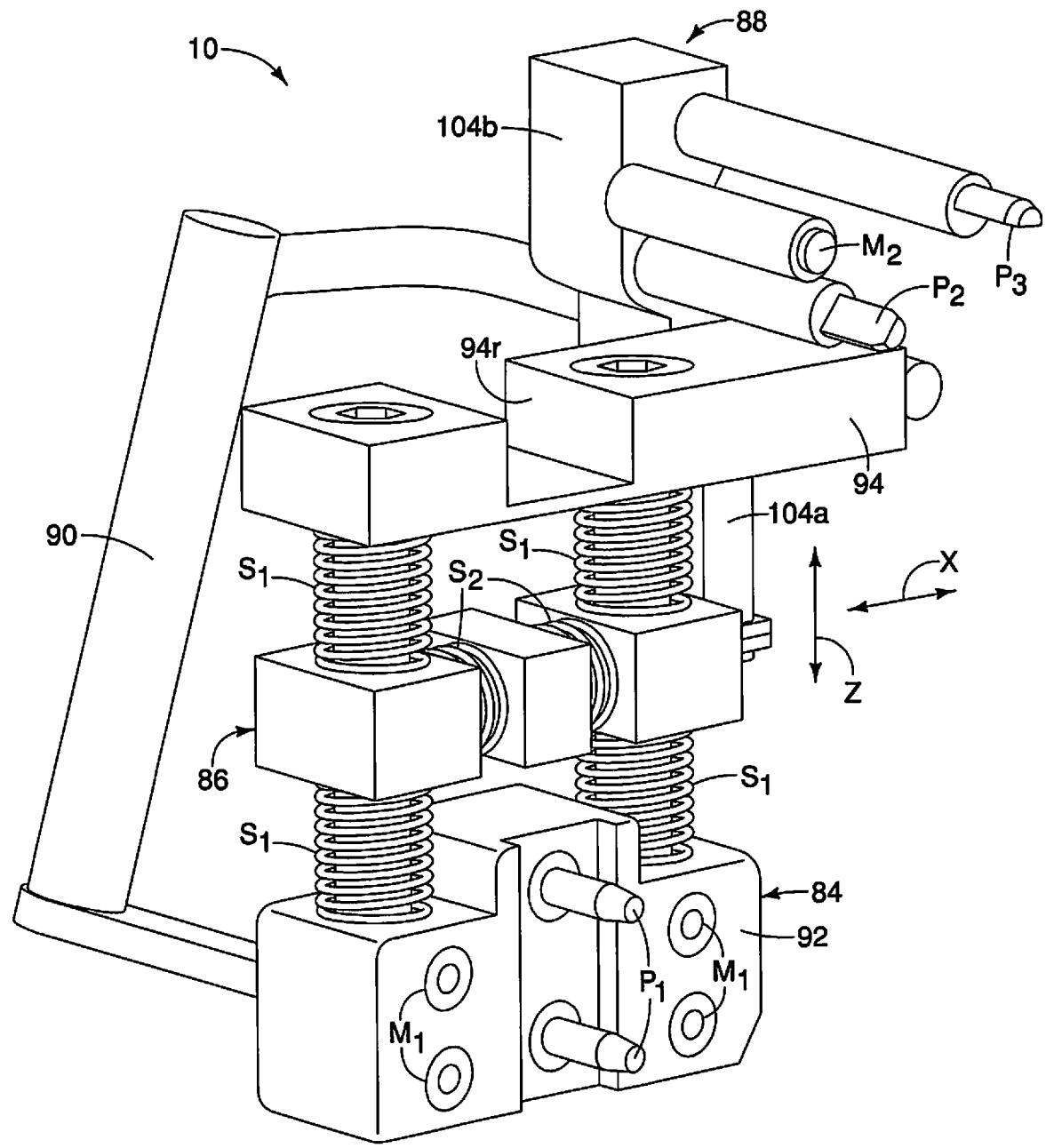
FIG. 1 is a perspective view of a latch mechanism jig in accordance with one depicted embodiment.

Referring initially to FIG. 1, a latch mechanism jig 10 is illustrated in accordance with a first embodiment. The latch mechanism jig 10 (hereinafter referred to as the jig 10) is configured to simplify an alignment process where a latch mechanism 12 (FIG. 2) is aligned with a latch striker 14 (FIG. 3) during the assembling process of a vehicle 16.

Figure 2:
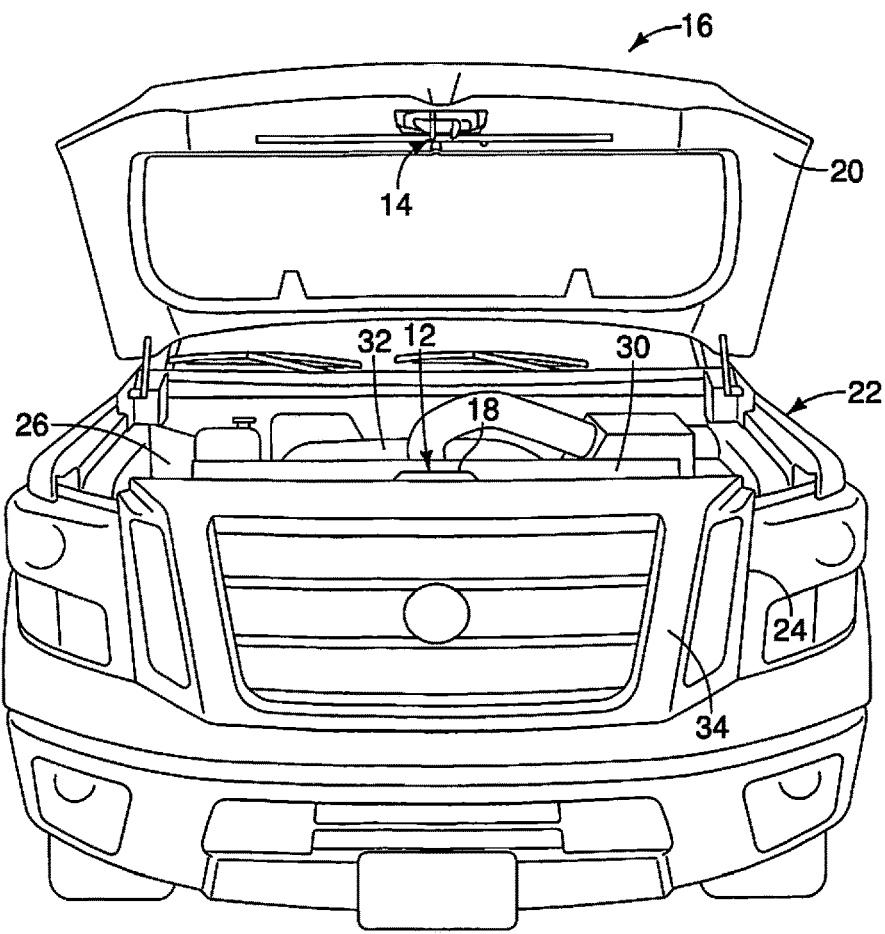
FIG. 2 is a front view of a vehicle showing a front grill, a hood in an open position revealing a latch striker fixed to a forward end of the hood and an upper portion of a latch mechanism with the remainder of the latch mechanism being concealed by the front grill in accordance with the depicted embodiment.
Figure 3:
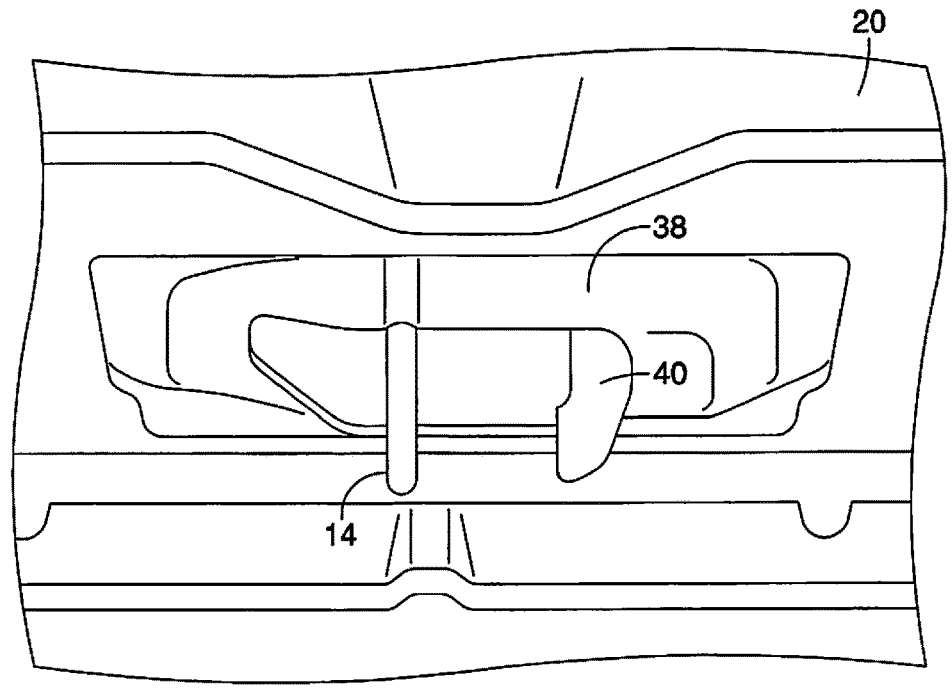
FIG. 3 is a front view of an underside of the forward end of the hood showing a base plant, a safety strike plate 40 and the striker in accordance with the depicted embodiment.
Figure 4:
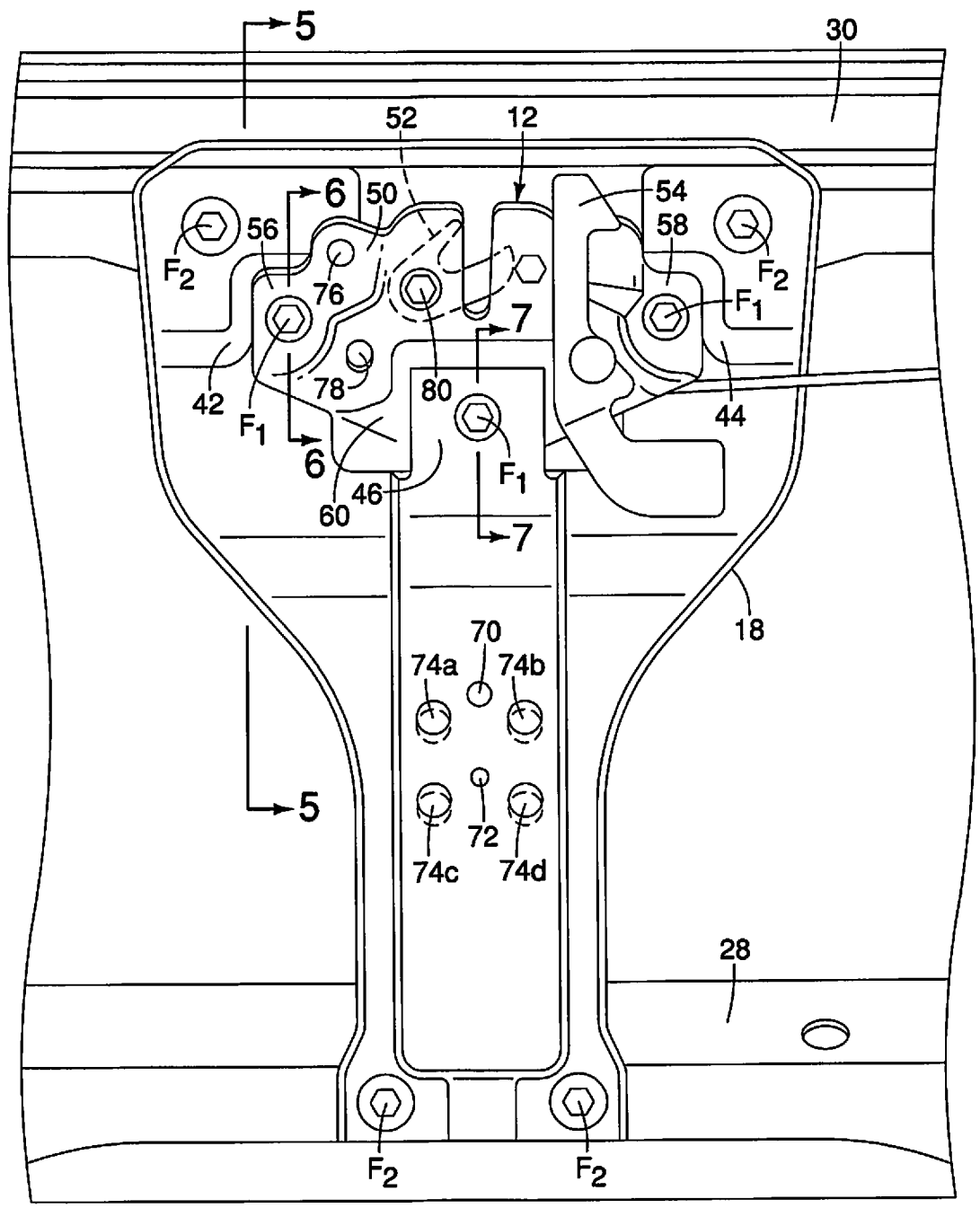
FIG. 4 is a front view of the vehicle with the front grill removed showing a vehicle bracket and the latch mechanism attached to the vehicle bracket in accordance with the depicted embodiment.

As shown in FIGS. 2 and 4, the latch mechanism 12 is attached to a vehicle bracket 18 via fasteners $F_1$. During the installation process, the fasteners $F_1$ are not initially tightened but are threaded in place to temporarily retain the latch mechanism 12 in place (but not necessarily in its aligned position). Rather, the jig 10 temporarily attaches to the bracket 18 and the latch mechanism 12, flexibly retaining the latch mechanism 12 in position. In other words, the jig 10 is configured to retain the latch mechanism 12, but allow the latch mechanism 12 to move in a X-direction (horizontal direction) and to move in a Z-direction (vertical direction) to a position that is aligned with the latch striker 14. The latch striker 14 is fixedly attached to a hood 20 of the vehicle 16, as shown in FIG. 3. After the jig 10 is installed to the bracket 18 and the latch mechanism 12, the hood 20 of the vehicle 16 is closed during the installation process causing the latch striker 14 to engage the latch mechanism 12 thereby forcing the latch mechanism 14 to move to the aligned position. Since the latch mechanism 12 is only loosely held in place, the latch mechanism 12 can move into the aligned position. Once the latch mechanism 12 is moved to the aligned position, the fasteners $F_1$ are tightened and the jig 10 removed.

The jig 10 is configured to allow the latch mechanism 12 to move into alignment with the fixed latch striker 14, in a manner described in greater detail below. The jig 10 makes aligning the latch mechanism 12 to the hood 20 and the latch striker 14 a task that only requires a single technician, thereby simplifying the installation and alignment of the latch mechanism 12 to the vehicle 10.

As shown in FIGS. 2 and 3, the vehicle 16 has a vehicle body structure 22 that includes, among other structures, a front-end structure 24, an engine compartment 26 and the hood 20. As shown in FIG. 4, the front-end structure 24 of the vehicle 16 includes laterally extending front beams 28 and 30. The vehicle bracket 18 (also sometimes referred to as a center mast, and hereinafter referred to as the bracket 18) extends vertically from the front beam 26 up to the front beam 28 forward of a radiator (not shown) of a cooling system (not shown) of an engine 32 (FIG. 2) of the vehicle 16. In FIG. 2, the front beam 30 is visible forward of the engine 32 and rearward of the front grill 34. The vehicle bracket 18 extends over a portion of an upper surface of the front beam 30, as shown in FIG. 4.

As shown in FIG. 3, the latch striker 14 is rigidly attached to a base plate 38 via, for example, metal welding techniques. A cup-shaped safety strike plate 40 is also rigidly fixed to the base plate 38 adjacent to but spaced apart from the latch striker 14. The base plate 38 is rigidly fixed to a forward underside of the hood 20 via mechanical fasteners (not shown) or welding techniques in a conventional manner.

As shown in FIG. 4 with the front grill 34 removed, the bracket 18 is vertically oriented and is centered relative to the front of the vehicle 16. A lower end of the bracket 18 is fixed to the front beam 28 via fasteners $F_2$, and an upper end of the bracket 18 is fixed to the front beam 30 via fasteners $F_2$. The bracket 18 includes a first side portion 42, a second side portion 44, and a central portion 46. The central portion 46 includes a cantilevered portion that extends upward.

Figure 5:
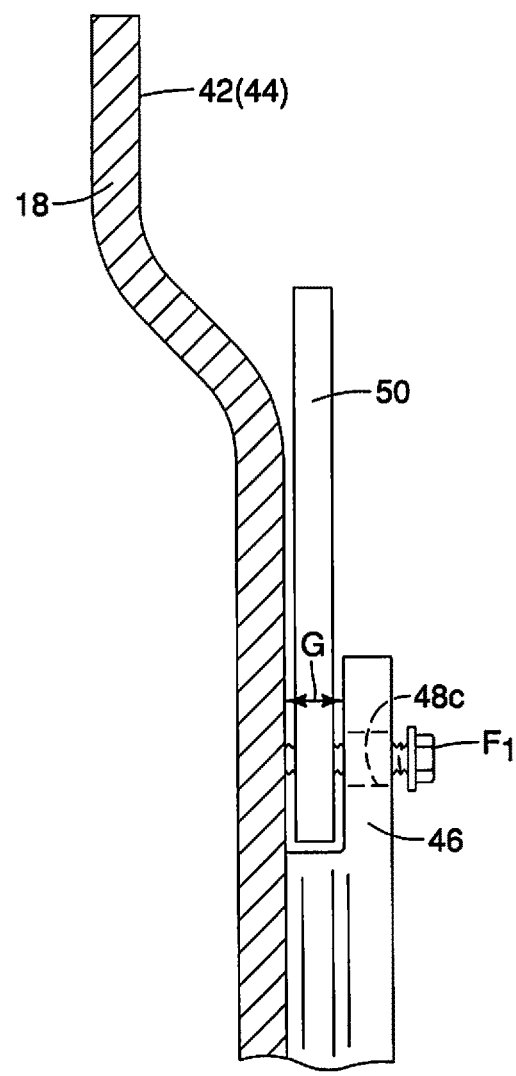
FIG. 5 is a cross-sectional side view of the vehicle bracket and the latch mechanism taken along the line 5-5 in FIG. 4 in accordance with the depicted embodiment.

As shown in FIG. 5, the central portion 46 is spaced apart from the first side portion 42 and the second side portion 44 thereby defining a gap G therebetween. As is also shown in FIG. 5, the central portion 46 is parallel to the first side portion 42 and the second side portion 44.

Figure 6:
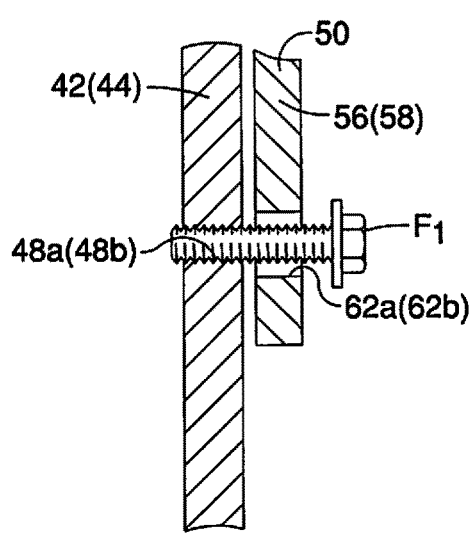
FIG. 6 is another cross-sectional side view of the vehicle bracket and the latch mechanism taken along the line 6-6 in FIG. 4 in accordance with the depicted embodiment.
Figure 7:
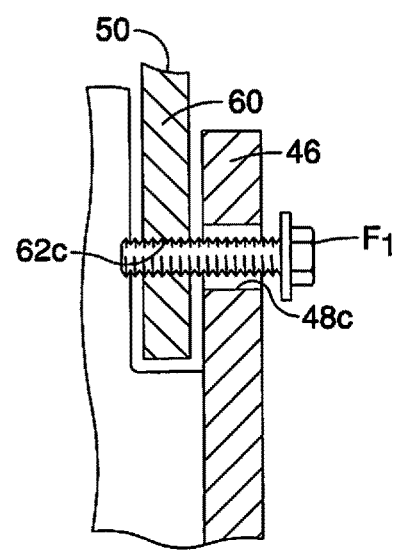
FIG. 7 is still another cross-sectional side view of the vehicle bracket and the latch mechanism taken along the line 7-7 in FIG. 4 in accordance with the depicted embodiment.

As shown in FIG. 6, the first side portion 42 includes a threaded opening 48a and the second side portion 44 includes a threaded opening 48b. As shown in FIG. 7, the central portion 46 includes an oversized opening 48c.

Returning to FIG. 4, the latch mechanism 12 includes a base plate 50, a pivoting latch 52, a safety latch 54 and an actuating mechanism (not shown) that releases the pivoting latch 52 in a conventional manner. The base plate 50 includes a first portion 56, a second portion 58 and a lower central portion 60. As shown in FIG. 6, the first portion 56 includes an oversized opening 62a and the second portion 58 includes an oversized opening 62b. As shown in FIG. 7, the lower central portion 60 includes a threaded opening 62c. Since pivoting latches, safety latches and actuating mechanism are conventional features of a latch mechanism, further description is omitted for the sake of brevity.

As shown in FIG. 5, when the latch mechanism 12 is initially fitted to the bracket 18, the base plate 50 is inserted into the gap G between the central portion 46 and the first and second side portions 42 and 44. Thus, as shown in FIG. 4, a central area of the base plate 50 of the latch mechanism 12 is covered by the central portion 46 of the vehicle bracket 18, while the remainder of the base plate 50 (including the first portion 56 and the second portion 58) overlays and covers upper areas of the vehicle bracket 18.

Once the base plate 50 is positioned into the gap G, a first one of the fasteners $F_1$ is threaded through the oversized opening 48c into the threaded opening 62c; a second one of the fasteners $F_1$ is threaded through the oversized opening 62a into the threaded opening 48a; and a third one of the fasteners $F_1$ is threaded through the oversized opening 62b and into the threaded opening 48b. Initially, the fasteners $F_1$ are left loose and are not tightened or torqued yet. Instead, the jig 10 is employed in a manner described further below prior to tightening or applying torque the fasteners $F_1$.

As shown in FIG. 4, the vehicle bracket 18 is provided with a first alignment aperture 70, a second alignment aperture 72 and four magnet receiving areas 74a, 74b, 74c and 74d.

The vehicle bracket 18 can be made of any of a variety of materials, but, is preferably made of a material that responds to magnets, such as a ferrous material. Alternatively, the vehicle bracket 18 can be made of a non-ferrous material, with inserts or small panels made of, for example, ferromagnetic materials that are attracted by magnets, that are welded, or otherwise attached to the vehicle bracket at locations corresponding to the four magnet receiving areas 74a, 74b, 74c and 74d. The four magnet receiving areas 74a, 74b, 74c and 74d are predetermined areas of the bracket 18 where magnets of the jig 10 (described further below) retain the jig in position 10, as is described further below.

The base plate 50 of the latch mechanism 12 includes a third alignment aperture 76, a fourth alignment aperture 78 and a magnet receiving member 80. In the depicted embodiment, the magnet receiving member 80 is also a pivot pin about which the pivoting latch 52 pivots.

Figure 8:
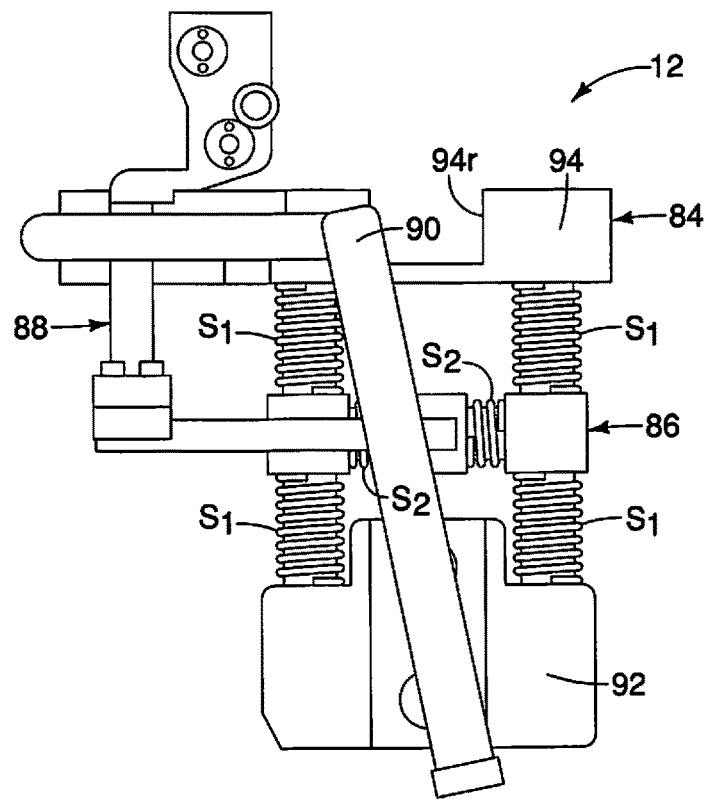
FIG. 8 is a front view of the latch mechanism jig showing a frame assembly, a carrier assembly, a hood latch supporting assembly and a handle in accordance with the depicted embodiment.
Figure 9:
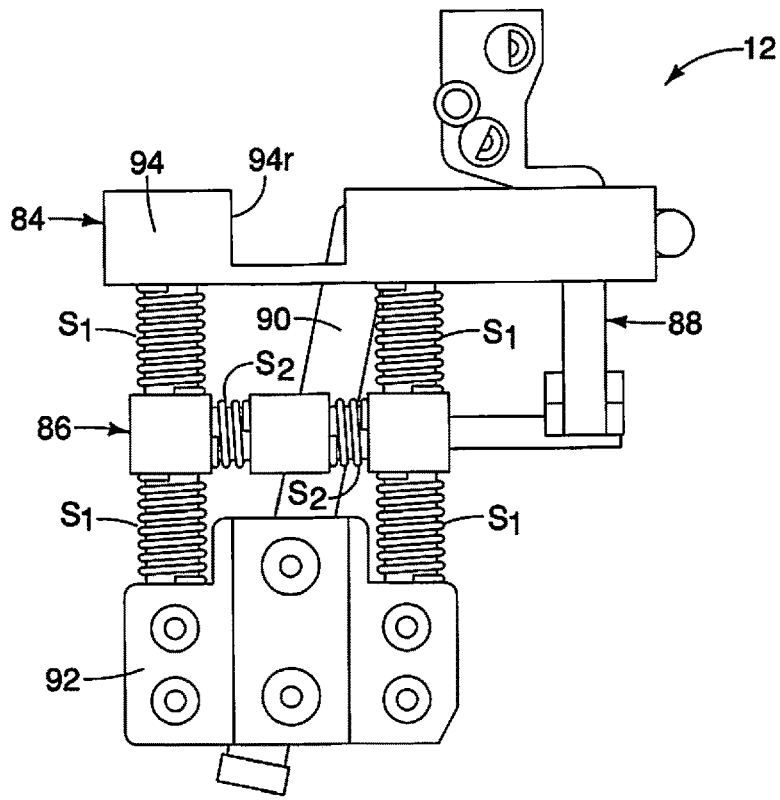
FIG. 9 is a rear view of the latch mechanism jig showing the frame assembly, the carrier assembly, the hood latch supporting assembly and the handle in accordance with the depicted embodiment.
Figure 60:
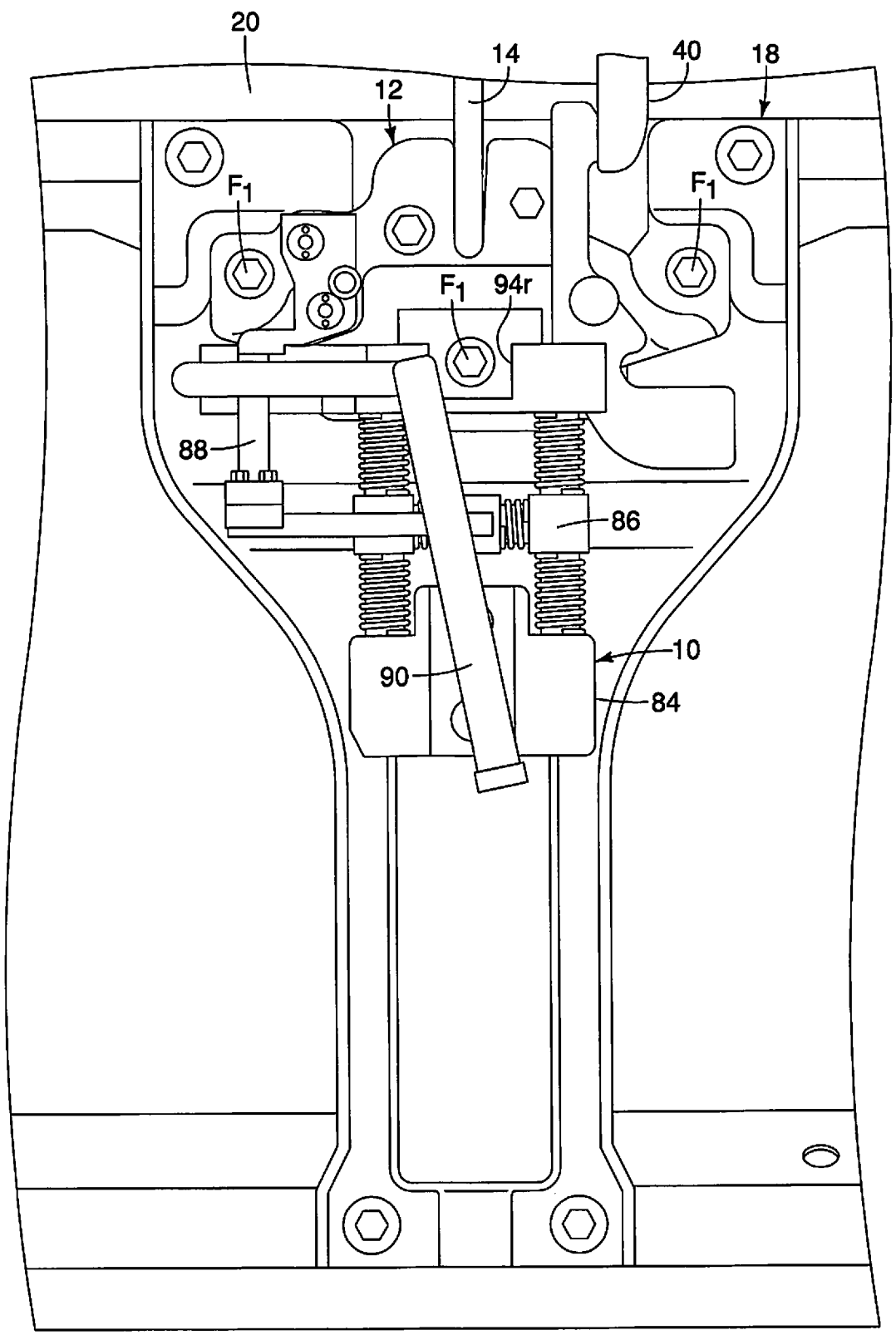
FIG. 60 is another elevational view of the vehicle bracket, the latch mechanism and the latch mechanism jig with the latch striker moved to a hood closed orientation such that the latch striker has moved the latch mechanism into an alignment position such that the fasteners $F_1$ can be tightened prior to removal of the latch mechanism jig therefrom in accordance with the depicted embodiment.

A description of the jig 10 is now provided with specific reference to FIGS. 8-60. As shown in FIGS. 8 and 9, the jig 10 includes a rigid frame assembly 84, a carrier assembly 86, a hood latch supporting assembly 88 and a handle 90. The carrier assembly 86 is biased to vertically centered position (Z-direction) between upper and lower ends of the frame assembly 84 via springs $S_1$. The hood latch supporting assembly 88 is biased to horizontally positioned as shown in FIGS. 8 and 9 (X-direction) relative to carrier assembly 86 via springs $S_2$.

A description of the frame assembly 84 is now provided with specific reference to FIGS. 10-22. In FIGS. 10-22, the frame assembly 84 and the various element that are assembled to form the frame assembly 84 are shown with the frame assembly 84 removed from all other elements of the jig 10.

Figure 22:
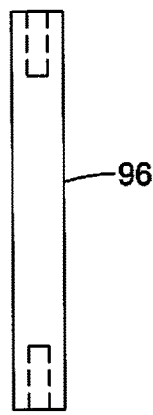
FIG. 22 is a side view of one of the shafts of the frame assembly in accordance with the depicted embodiment.

The frame assembly 84 basically includes a lower block 92 (FIGS. 12-15), an upper block 94 (FIGS. 16-20) and a pair of first shafts 96 (FIG. 22). Although not shown in FIGS. 10 and 11, the springs $S_1$ (FIG. 21) can be considered to be part of the frame assembly 84 and are shown in FIGS. 8 and 9.

Figure 14:
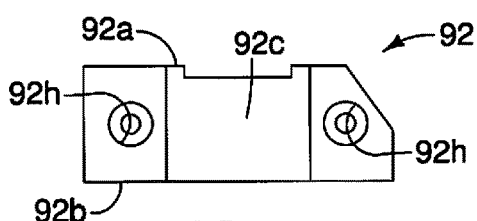
FIG. 14 is an elevational view of an upper surface of the lower block of the frame assembly in accordance with the depicted embodiment.
Figure 15:
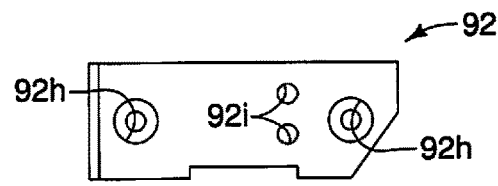
FIG. 15 is an elevational view of a lower surface of the lower block of the frame assembly in accordance with the depicted embodiment.
Figure 44:
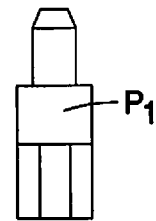
FIG. 44 is a side view of a first alignment pin that is shown in FIG. 1 mounted to the latch mechanism jig in accordance with the depicted embodiment.
Figure 45:
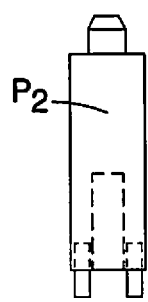
FIG. 45 is a side view of a second alignment pin that is shown in FIG. 1 mounted to the latch mechanism jig in accordance with the depicted embodiment.
Figure 46:
FIG. 46 is an end view of the second alignment pin shown in FIG. 45 in accordance with the depicted embodiment.
Figure 47:
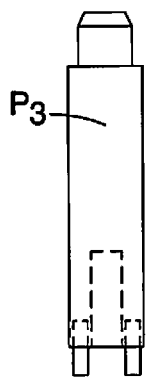
FIG. 47 is a side view of a third alignment pin that is shown in FIG. 1 mounted to the latch mechanism jig in accordance with the depicted embodiment.
Figure 48:
FIG. 48 is an end view of the third alignment pin shown in FIG. 47 in accordance with the depicted embodiment.

The lower block 92 has a first surface 92a (FIG. 12), a second surface 92b (FIG. 13), an upper surface 92c (FIG. 14) and a lower surface 92d (FIG. 15). The first surface 92a defines a vehicle bracket attachment portion 100. The vehicle bracket attachment portion 100 (the first surface 92a) includes openings 92e and openings 92f. The openings 92e receive and retain first alignment pins $P_1$, as shown in FIG. 1. The first alignment pins $P_1$ are fixed within the openings 92e via mechanical fasteners (not shown) or can be press-fitted in place. The first alignment pins $P_1$ are located and oriented such that when the jig 10 is used, the first alignment pins $P_1$ are inserted into the first and second alignment apertures 70 and 72 of the bracket 18 in a manner described in greater detail below. The pins $P_1$ are shown removed from the jig 10 in FIG. 44.

The openings 92f are located in pairs on opposite sides of the openings 92e. The four openings 92f receive and retain magnets $M_1$ along the first surface 92a (the vehicle bracket attachment portion 100). The magnets $M_1$ can be fixed in place within the openings 92f by fasteners (not shown) or can be press-fitted in place. The magnets $M_1$ are configured and positioned to contact and magnetically engage the four magnet receiving areas 74a, 74b, 74c and 74d of the bracket 18. The magnets $M_1$ retain the jig 10 to the bracket 18 with the first alignment pins $P_1$ positioning the jig 10 in a predetermined location relative to the bracket 18.

Figure 13:
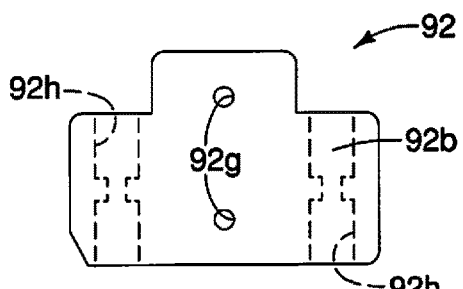
FIG. 13 is an elevational view of a front surface of the lower block of the frame assembly in accordance with the depicted embodiment.

As shown in FIG. 13, the second surface 92b of the lower block 92 of the frame assembly 84 includes a pair of openings 92g that extend to and are co-axial with the openings 92e and are dimensioned to receive fasteners that attach to the first alignment pins $P_1$, thereby securing them in place to the jig 10.

As shown in FIG. 14, the upper surface 92c of the lower block 92 of the frame assembly 84 includes a pair of openings 92h that are dimensioned to receive lower ends of the first shafts 96. The first shafts 96 can be press-fitted into the openings 96h or can be held in by a mechanical fastener (not shown). The first shafts 96 are parallel to each other and extend from the lower block 92 to the upper block 94.

As shown in FIG. 15, the openings 96h extend through to the lower surface 92d and include shoulder (a diminished diameter portion) to receive a mechanical fastener (not shown) securing the first shafts 96 in position. The lower surface 92d also includes a pair of openings 92i used to couple the handle 90 to the lower block 92 in a manner described in greater detail below.

Figure 17:
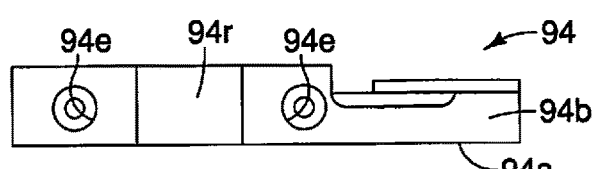
FIG. 17 is an elevational view of a top surface of the upper block of the frame assembly in accordance with the depicted embodiment.
Figure 21:
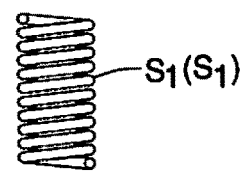
FIG. 21 is a side view of one of the springs of the latch mechanism jig in accordance with the depicted embodiment.
Figure 18:
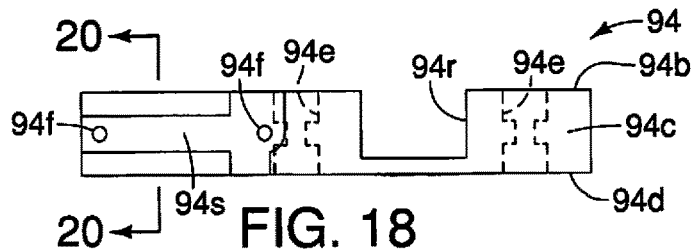
FIG. 18 is an elevational view of a front surface of the upper block of the frame assembly in accordance with the depicted embodiment.
Figure 19:
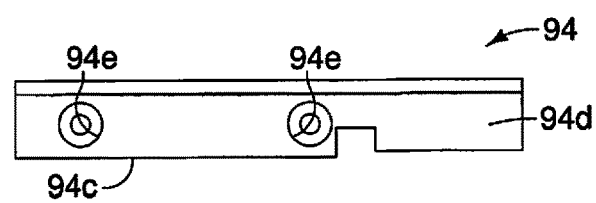
FIG. 19 is an elevational view of a lower surface of the upper block of the frame assembly in accordance with the depicted embodiment.

As shown in FIGS. 16-19, the upper block 94 includes a first surface 94a (FIG. 16), an upper surface 94b (FIG. 17), a second surface 94c (FIG. 18) opposite the first surface 94a and a lower surface 94d (FIG. 19).

Figure 16:
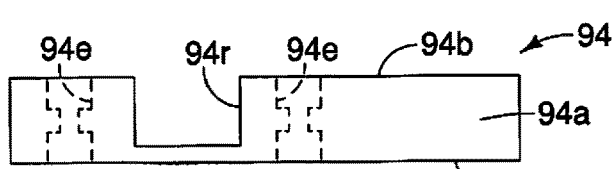
FIG. 16 is an elevational view of a rear view of the upper block of the frame assembly in accordance with the depicted embodiment.

As shown in FIG. 16, the first surface 94a (FIG. 16) has no openings but does show a recess 94r that allows access to one of the fasteners $F_1$ when aligning the latch mechanism 12 with the latch striker 14. FIG. 16 also shows in phantom a pair of openings 94e that receive upper ends of the first shafts 96. The openings 94e extend from the lower surface 94d to the upper surface 94b.

FIG. 17 shows the upper surface 94b of the upper block 94 which includes the openings 94e and shows the recess 94r.

FIG. 18 show the second surface 94c of the upper block 94. The second surface 94c defines an elongated recess 94s whose purpose is described in greater detail below.

FIG. 19 shows the lower surface 94d of the upper block 94. The lower surface 94d includes the openings 94e, that receive the upper ends of the first shafts 96.

Figure 20:
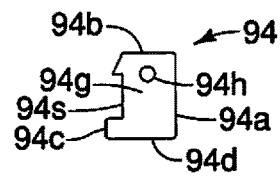
FIG. 20 is an elevational view of an end surface of the upper block in accordance with the depicted embodiment.

FIG. 20 shows an end surface 94g which includes an opening 94h and shows the elongated recess 94s. The opening 94h is a threaded opening that receives a fastener to attach an upper end of the handle 90 to the frame assembly 84.

A description of the carrier assembly 86 is now provided with specific reference to FIGS. 23-26. In FIGS. 23-26, the carrier assembly 86 and the various elements that are assembled to form the carrier assembly 86 are shown with the carrier assembly 86 removed from all other elements of the jig 10.

Figure 23:
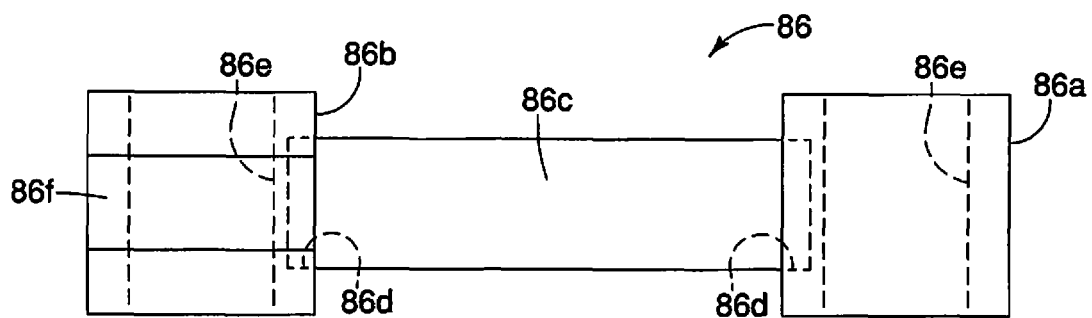
FIG. 23 is an elevational view of an front surface of the carrier assembly shown removed from the frame assembly in accordance with the depicted embodiment.
Figure 24:
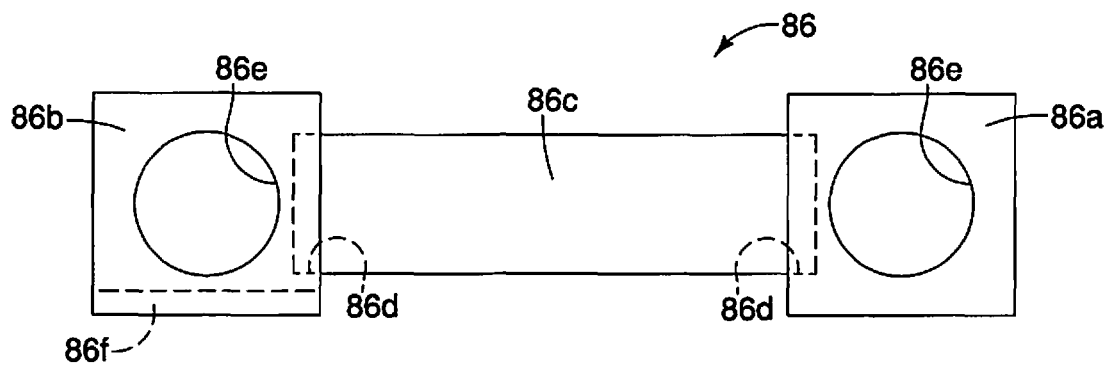
FIG. 24 is an elevational view of a top surface of the carrier assembly in accordance with the depicted embodiment.
Figure 25:
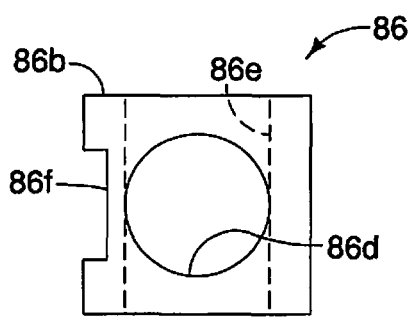
FIG. 25 is an elevational view of one end surface of the carrier assembly in accordance with the depicted embodiment.
Figure 26:
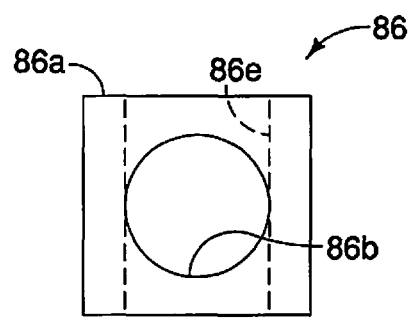
FIG. 26 is an elevational view of an opposite end surface of the carrier assembly in accordance with the depicted embodiment.
Figure 36:
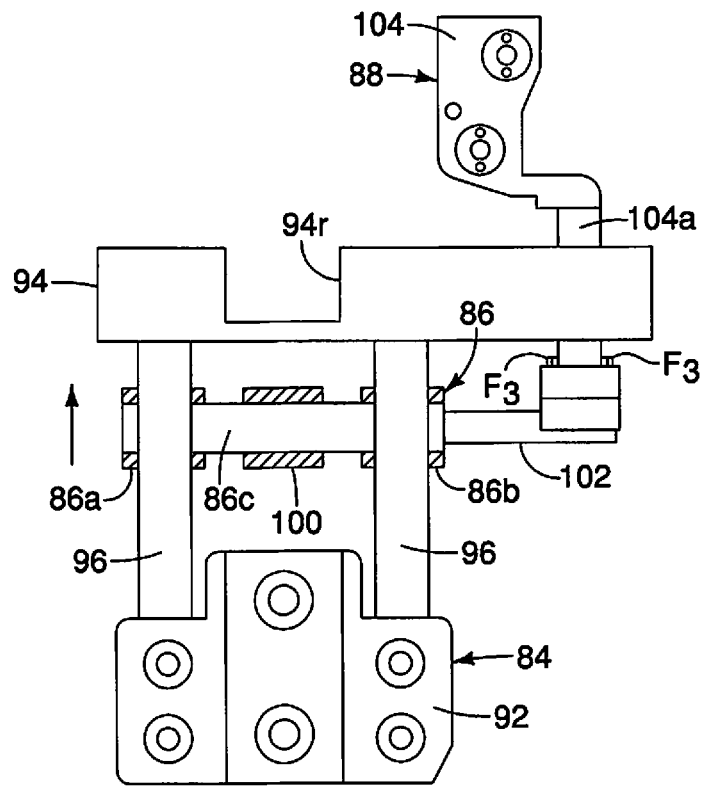
FIG. 36 is a rear view of the latch mechanism jig similar to FIG. 34 showing the carrier assembly moved upward in a Z direction along the shafts of the frame assembly relative to the centered position shown in FIG. 34 in accordance with the depicted embodiment.
Figure 37:
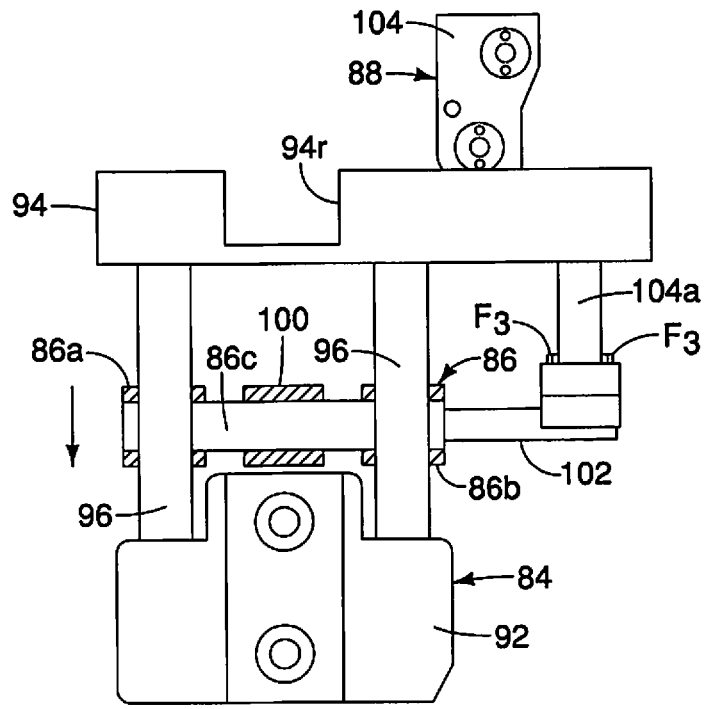
FIG. 37 is a rear view of the latch mechanism jig similar to FIG. 34 showing the carrier assembly moved downward in a Z direction along the shafts of the frame assembly relative to the centered position shown in FIG. 34 in accordance with the depicted embodiment.
Figure 57:
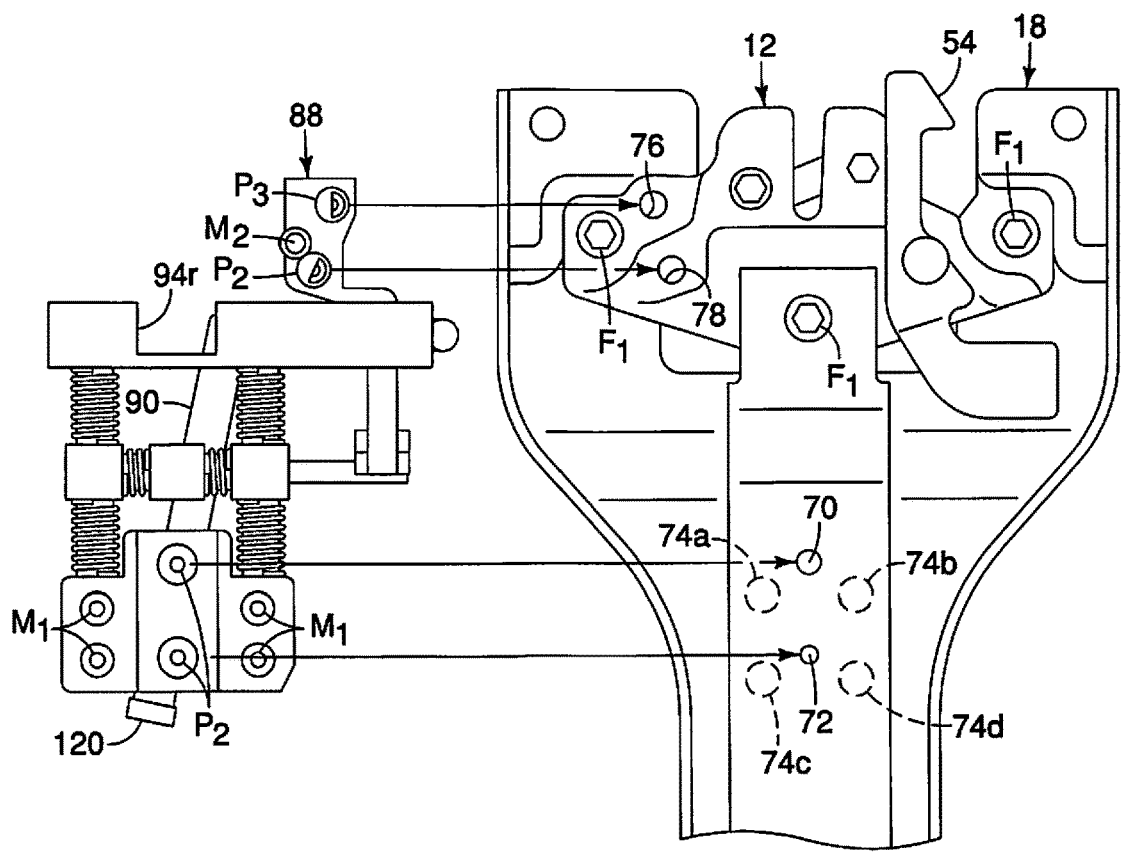
FIG. 57 is an elevational view of the vehicle bracket and the latch mechanism depicted in FIG. 4, showing the latch mechanism jig prior to attachment to the vehicle bracket and the latch mechanism in accordance with the depicted embodiment.
Figure 58:
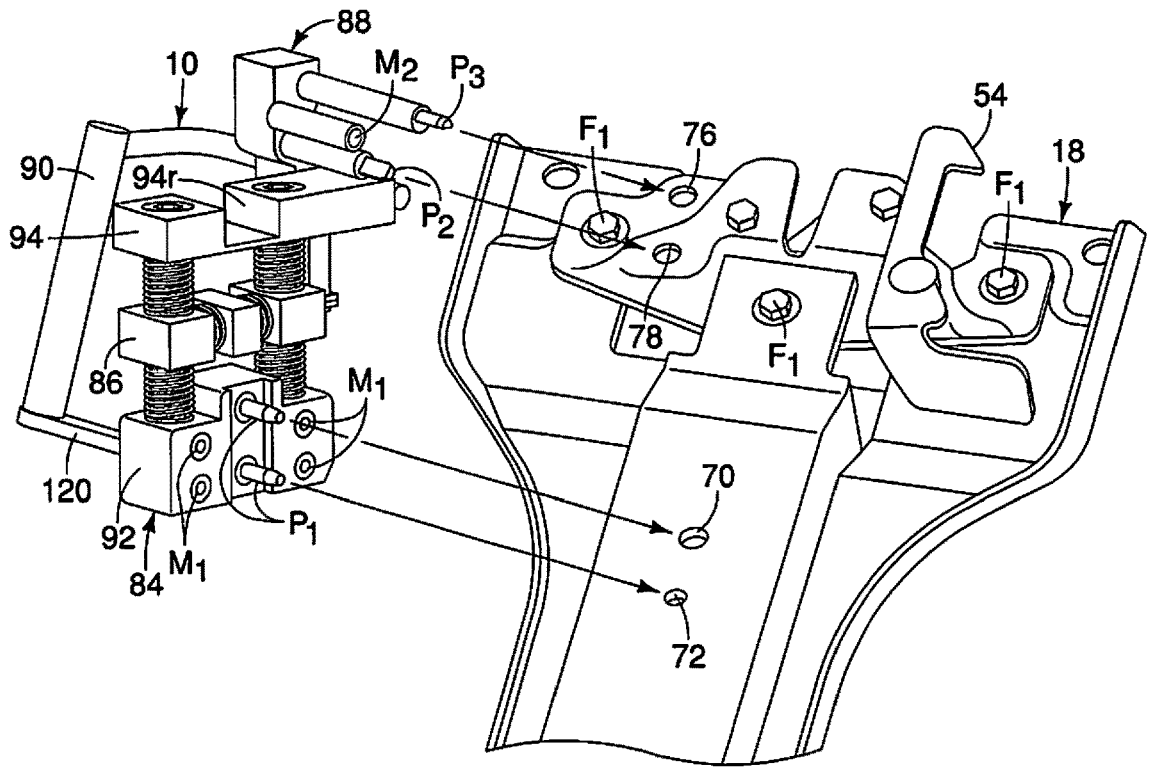
FIG. 58 is a perspective view of the vehicle bracket, the latch mechanism and the latch mechanism jig prior to attachment of the latch mechanism jig to the vehicle bracket and the latch mechanism in accordance with the depicted embodiment.

A side view of the carrier assembly 86 is shown in FIG. 23, a top view in FIG. 24 and end views in FIGS. 25 and 26. The carrier assembly 86 includes a first slider 86a, a second slider 86b and a second shaft 86c. The first and second sliders 86a and 86b include openings 86d that receive opposite ends of the second shaft 86c, as shown in FIGS. 23 and 24. The first slider 86a and the second slider 86b also include bores 86e that extend completely through the first and second sliders 86a and 86b. The bores 86e are dimensioned to receive the first shafts 96 such that the carrier assembly 86 can slide vertically in the Z-direction along the first shafts 96, as is demonstrated in FIGS. 36 and 37 (with the springs $S_1$ and $S_2$ removed). The first and second sliders 86a and 86b freely slide along the lengths of the first shafts 96 in the absence of the springs $S_1$. The second slider 86b also includes a recessed area or recess 86f that extends in a direction perpendicular to the bore 86d, as shown in FIGS. 23, 24 and 25. With the springs $S_1$ installed on upper and lower sides of the first and second sliders 86a and 86b, the first and second sliders 86*a* and 86*b* are biased to move to a substantially centered position between the lower block 92 and the upper block 94, as shown in FIGS. 1, 57 and 58.

A description of the hood latch supporting assembly 88 is now provided with specific reference to FIGS. 27-33. The hood latch supporting assembly 88 and the various elements that are assembled to form the hood latch supporting assembly 88 are shown in FIGS. 27-33 and 41-48 with the hood latch supporting assembly 88 removed from all other elements of the jig 10.

Figure 27:
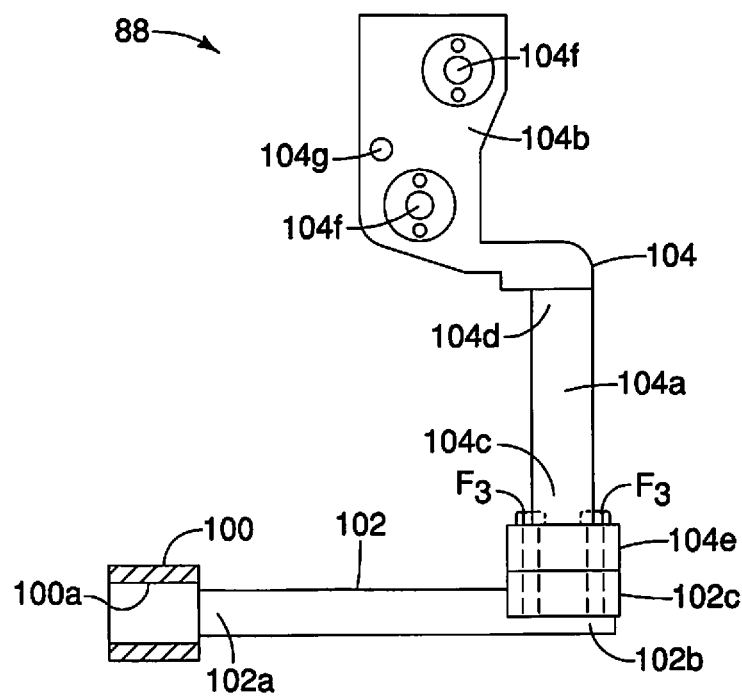
FIG. 27 is an elevational view of a rear surface of the hood latch supporting assembly showing a slider, an extension member and a latch support portion in accordance with the depicted embodiment.
Figure 28:
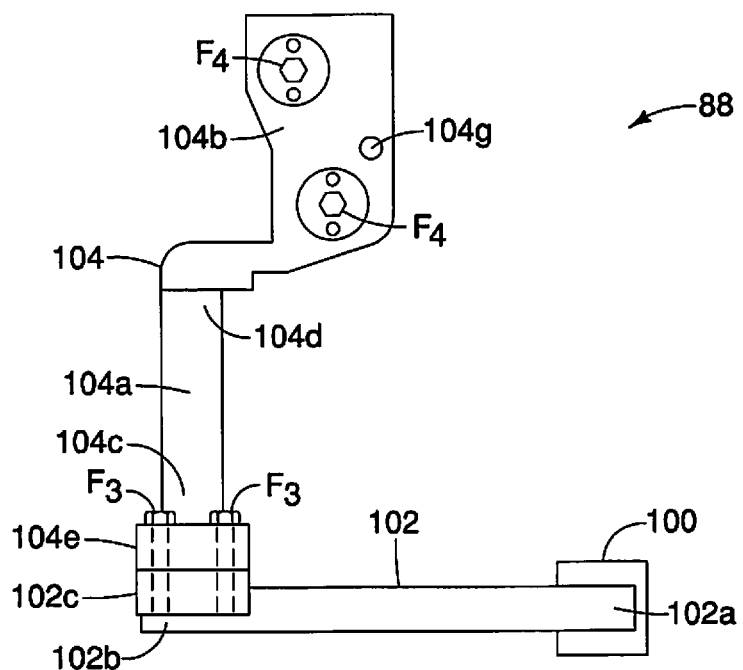
FIG. 28 is an elevational view of a front surface of the hood latch supporting assembly showing the slider, the extension member and the latch support portion in accordance with the depicted embodiment.
Figure 29:
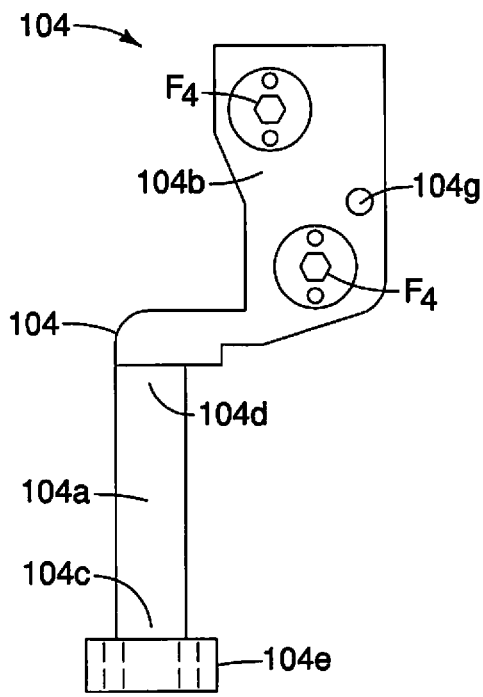
FIG. 29 is an elevational view of the front surface of the latch support portion of the hood latch supporting assembly in accordance with the depicted embodiment.
Figure 30:
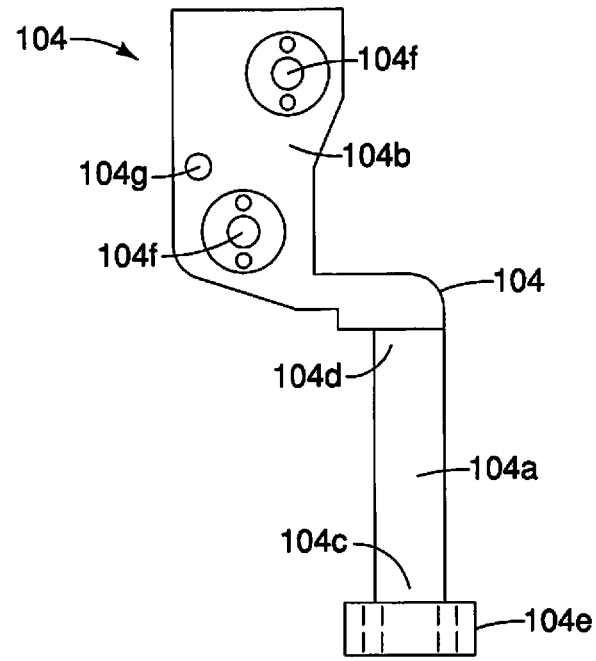
FIG. 30 is an elevational view of the rear surface of the latch support portion of the hood latch supporting assembly in accordance with the depicted embodiment.
Figure 31:
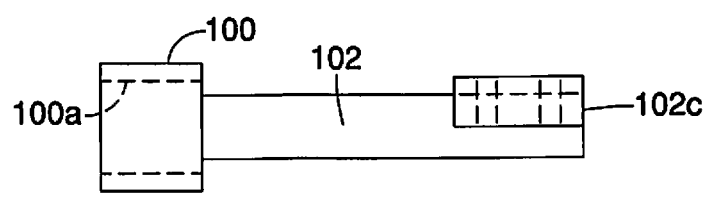
FIG. 31 is an elevational view of the rear surface of the slider and the extension member of the hood latch supporting assembly in accordance with the depicted embodiment.
Figure 32:
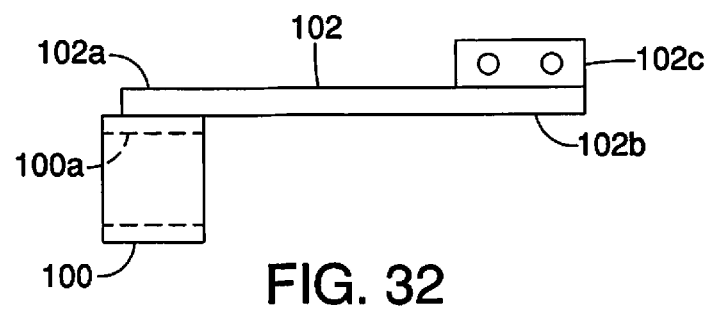
FIG. 32 is an elevational view of the top surface of the slider and the extension member of the hood latch supporting assembly in accordance with the depicted embodiment.
Figure 33:
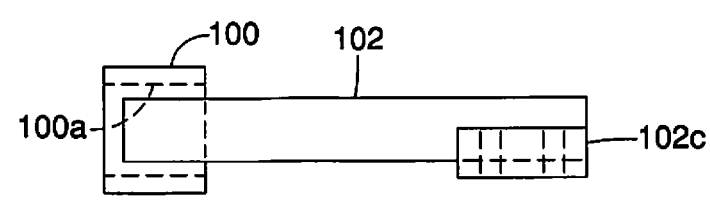
FIG. 33 is an elevational view of the front surface of the slider and the extension member of the hood latch supporting assembly in accordance with the depicted embodiment.
Figure 34:
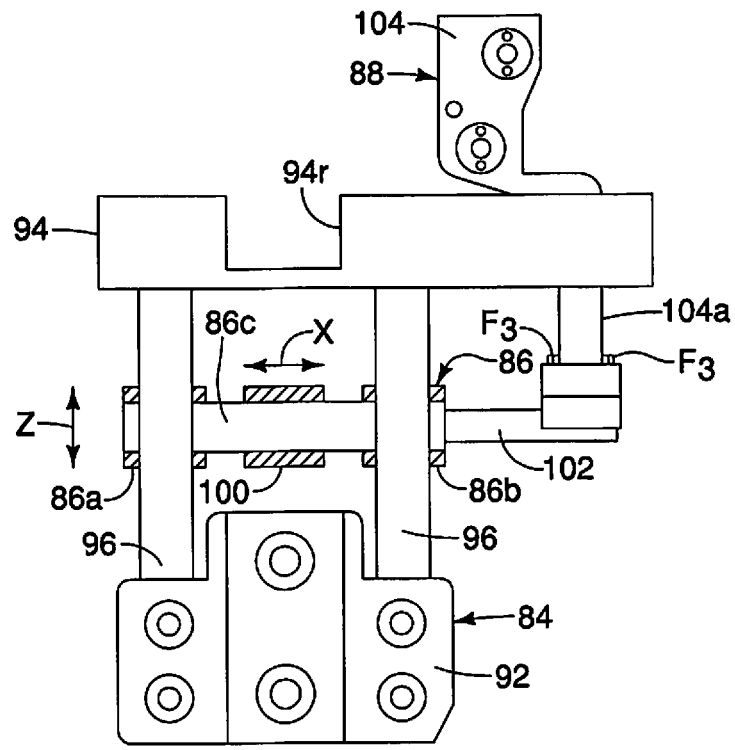
FIG. 34 is a rear view of the latch mechanism jig with the frame assembly, the carrier assembly installed to the shafts of the frame assembly and the hood latch supporting assembly installed to the shaft of the carrier assembly with the springs and the handle removed, showing the slider of the hood latch supporting assembly substantially centered along the shaft of the carrier assembly and the carrier assembly centered along the shafts of the frame assembly in accordance with the depicted embodiment.
Figure 35:
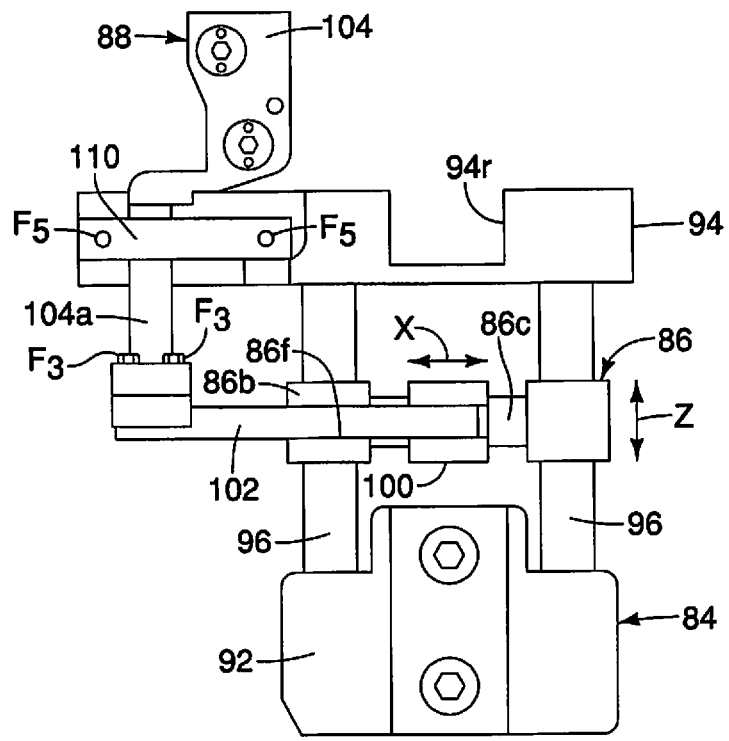
FIG. 35 is a front view of the latch mechanism jig with the frame assembly, the carrier assembly installed to the shafts of the frame assembly and the hood latch supporting assembly installed to the shaft of the carrier assembly with the springs and the handle removed showing the slider of the hood latch supporting assembly substantially centered along the shaft of the carrier assembly and the carrier assembly centered along the shafts of the frame assembly in accordance with the depicted embodiment.

As shown in FIGS. 27 and 28, the hood latch supporting assembly 88 includes a slider 100, an extension member 102 and a latch support portion 104. The slider 100, the extension member 102 and the latch support portion 104 are all rigidly attached to one another such that the hood latch supporting assembly 88 is a rigid assembly that moves as a single unit relative to the carrier assembly 86.

Figure 38:
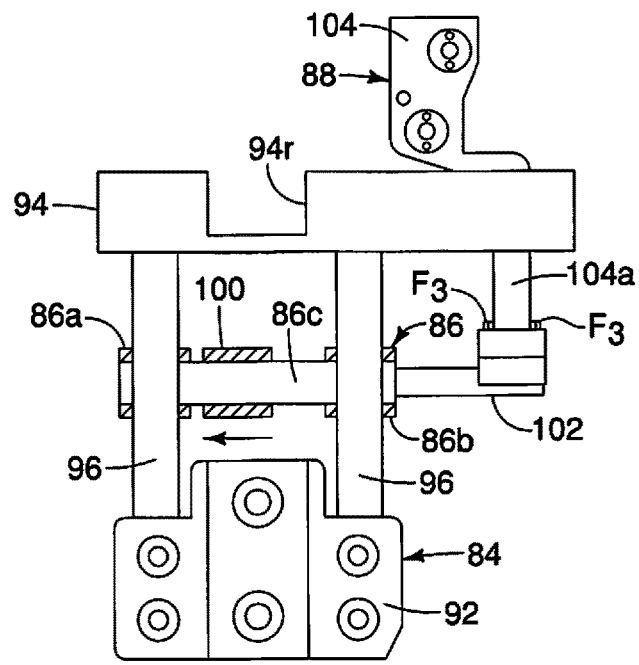
FIG. 38 is a rear view of the latch mechanism jig similar to FIG. 34 showing the hood latch supporting assembly moved in a first lateral direction (an X direction) along the shaft of the carrier assembly relative to the centered position shown in FIG. 34 in accordance with the depicted embodiment.
Figure 40:
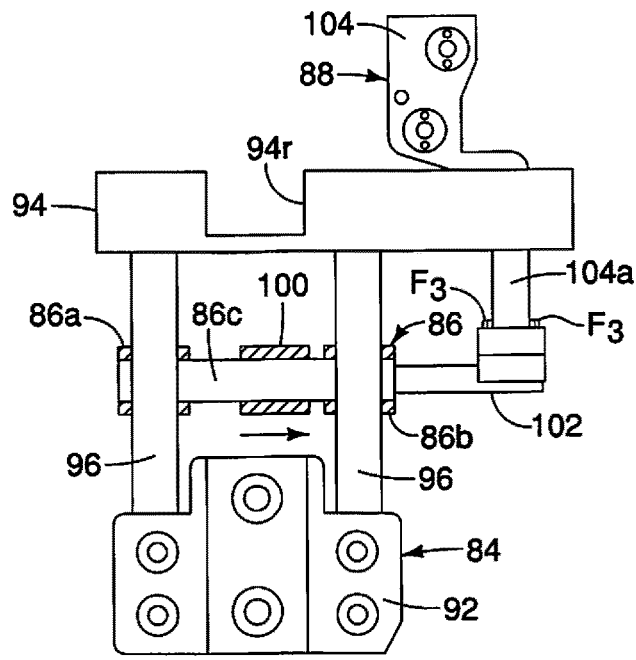
FIG. 40 is another rear view of the latch mechanism jig similar to FIG. 34 showing the hood latch supporting assembly moved in a second lateral direction (an X direction) opposite the first lateral direction along the shaft of the carrier assembly relative to the centered position shown in FIG. 34, in accordance with the depicted embodiment.
Figure 41:
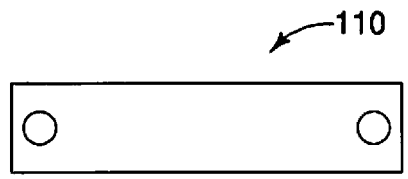
FIG. 41 is a front view of a bracket that is shown in FIG. 39 mounted to the upper block of the frame assembly in accordance with the depicted embodiment.
Figure 42:
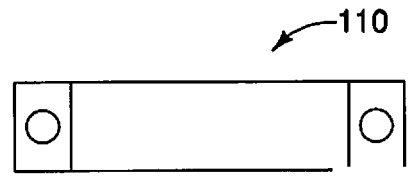
FIG. 42 is a front view of the bracket shown in FIG. 41 in accordance with the depicted embodiment.
Figure 43:
FIG. 43 is a top view of the bracket shown in FIGS. 41 and 42 in accordance with the depicted embodiment.

The slider 100 is a block of metallic material with a bore 100*a* formed therethrough, as shown in cross-section in FIG. 27. The bore 100*a* is dimensioned to receive the second shaft 86*c* of the carrier assembly 86. More specifically, with the springs $S_2$ removed, the slider 100 can slide in the X-direction along the length of the second shaft 86*c*, as shown in FIGS. 38 and 40. With the springs $S_2$ installed on either side of the slider 100, the slider 100 is biased to move to a substantially centered position between the first shafts 96, as shown in FIGS. 1, 57 and 58.

The extension member 102 is a metallic rod or beam that has a first end 102*a* and a second end 102*b*. The extension member 102 is also referred to as a first part of the hood latch supporting assembly 88. The first end 102*a* is rigidly fixed to the slider 100 (the slider member) via mechanical fasteners (not shown) or welding techniques. The second end 102*b* is rigidly fixed to an attachment block 102*c* via mechanical fasteners (not shown) or welding techniques via fasteners $F_3$. The attachment block 102*c* is fixed to the latch support portion 104 in a manner described further below.

The latch support portion 104 (also referred to as a second part of the hood latch supporting assembly 88) includes an elongated extension member 104*a* and a latch engaging part 104*b*. The elongated extension member 104*a* includes a lower end 104*c* and an upper end 104*d*. The lower end 104*c* is fixed to an attachment block 104*e* via fasteners (not shown) or welding techniques. The attachment block 104*e* is fixed to the attachment block 102*c* of the extension member 102 via fasteners $F_3$.

The latch engaging part 104*b* is a plate that can be an integral part of the elongated extension member 104*a* or can be a separate element welded to or otherwise fixed to the elongated extension member 104*a*. In the depicted embodiment, the latch engaging part 104*b* and the elongated extension member 104*a* are machined from a single block of metallic material.

As shown in FIGS. 27, 28, 34 and 35, the extension member 102 (the first part) extends in a direction parallel to the second shaft 86*c* with the elongated extension member 104 (the second part) extending in a direction perpendicular to the extension member 102. When assembled to the carrier assembly 86 and the frame assembly 84, the elongated extension member 104 extends to the upper block 94 with the latch engaging part 104*b* being substantially located at an area above the upper block 94 of the frame assembly 84, as shown in FIGS. 34-40.

It should be understood from the drawings and the description herein that the overall shape of the hood latch supporting assembly 88 (including the extension member 102 and the latch support portion 104) is provided to allow easy access to the fasteners $F_1$ when tightening or torqueing the fasteners $F_1$ to fixed the latch mechanism 12 in the alignment position, as is described further below. Further, the hood latch supporting assembly 88 can be made with fewer elements, and/or with a differing overall shape as long as that shape does not interfere with access to the fasteners $F_1$. Further, the overall shape of the hood latch support assembly 88 can be modified depending upon the shape, configuration and attachment location of any of a variety of latch mechanism designs and need not be the shape and configuration shown in the drawings.

The latch engaging part 104*b* further includes two openings 104*f* and an opening 104*g*, as shown in FIG. 27. As shown in FIGS. 1, 57 and 58, the latch engaging part 104*b* of the latch support portion 104 of the hood latch supporting assembly 88 includes a pair of alignment pins $P_2$ and at least one magnet $M_2$. The alignment pins $P_2$ and $P_3$ are shown removed from the jig 10 in FIGS. 45-48. The alignment pins $P_2$ can be press-fitted into openings 104*f* or held in position by fasteners $F_4$ shown in FIG. 28. The magnet $M_2$ can be press-fitted into openings 104*g* or held in position by a fastener (not shown).

Figure 10:
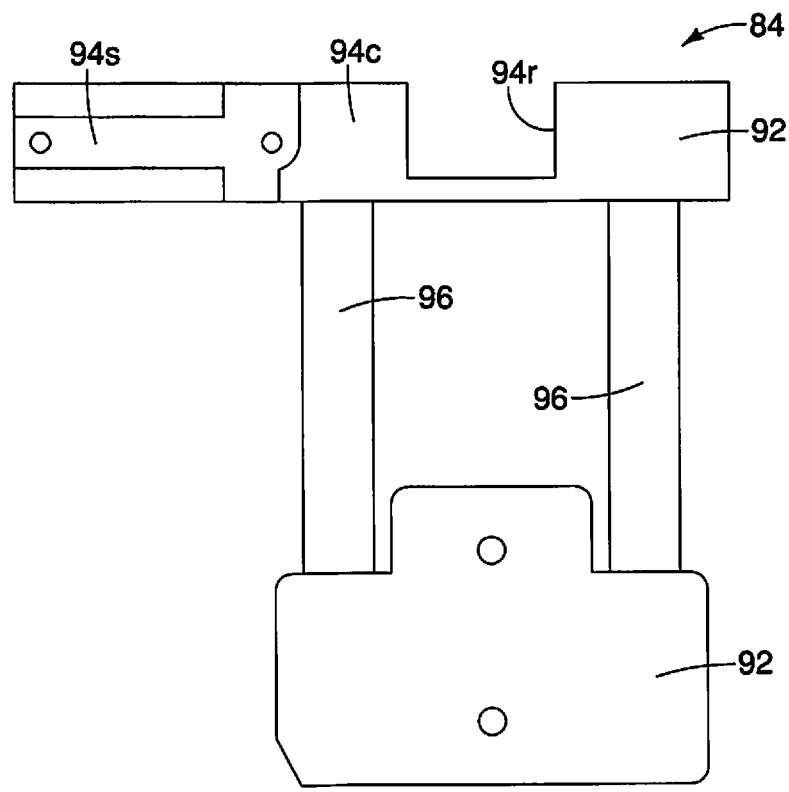
FIG. 10 is a front view of the frame assembly removed from other elements of the latch mechanism jig showing a lower block, an upper block and a shaft in accordance with the depicted embodiment.
Figure 11:
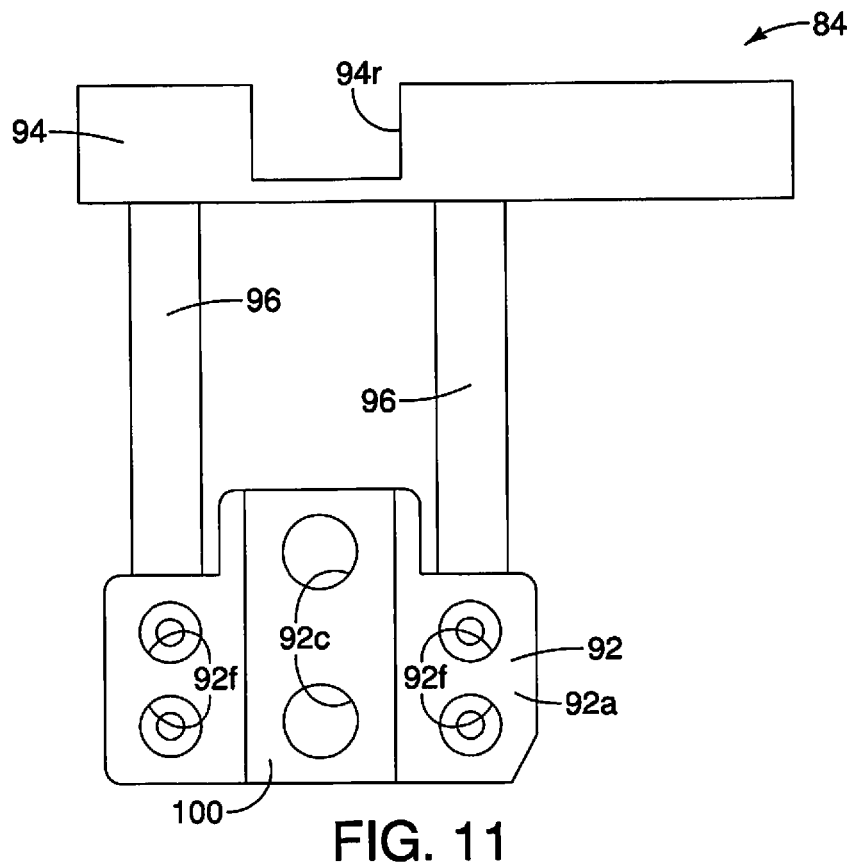
FIG. 11 is a rear view of the frame assembly removed from other elements of the latch mechanism jig showing the lower block, the upper block and the shaft in accordance with the depicted embodiment.
Figure 12:
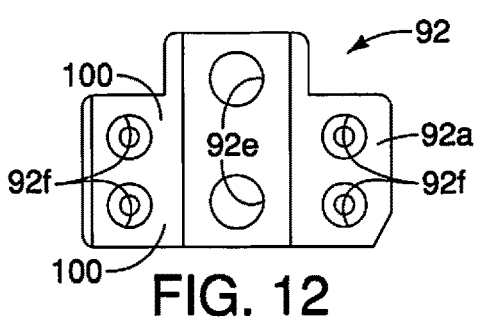
FIG. 12 is an elevational view of a rear surface of the lower block of the frame assembly in accordance with the depicted embodiment.
Figure 39:
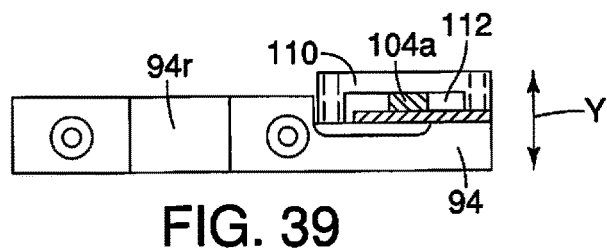
FIG. 39 is a top cross-sectional view of the latch mechanism jig showing a structure of the frame assembly that defines an elongated slot with a portion of the hood latch supporting assembly extending through the elongated slot in accordance with the depicted embodiment.

As shown in FIGS. 10, 18 and 20, the upper block 94 of the frame assembly 84 includes the elongated recess 94*s*. FIGS. 35, 39 and 41-43 show a bracket 110. The bracket 110 is attached to the upper block 94 via fasteners $F_5$ that thread into the openings 94*f* within the elongated recess 94*s*. As shown in FIG. 39, the upper block 94 and the bracket 110 define an elongated slot 112 with the elongated extension member 104*a* extending therethrough. The elongated slot 112 extends in a direction parallel to the second shaft 86*c* of the carrier assembly 86. With the elongated extension member 104*a* extending through the elongated slot 112, the hood latch supporting assembly 88 is able to move in the Z direction, as demonstrated in FIGS. 36 and 37 and is able to move in the X direction, as demonstrated in FIGS. 38 and 40 within the confines of the elongated slot 112. However, the dimensions and orientation of the elongated slot 112 prevent movement of the elongated extension member 104*a* and hence the hood latch supporting assembly 88 in a Y direction, as shown in FIG. 39, where the Y direction is perpendicular to both the X direction and the Z direction.

A description of the handle portion 90 is now provided with specific reference to FIGS. 1, 8-9 and 49-56. The handle portion 90 is shown removed from the jig 10 in FIGS. 49-56. The handle portion 90 includes a lower portion 116, an upper portion 118 and an attachment bracket 120 (shown in FIGS. 53-56).

Figure 49:
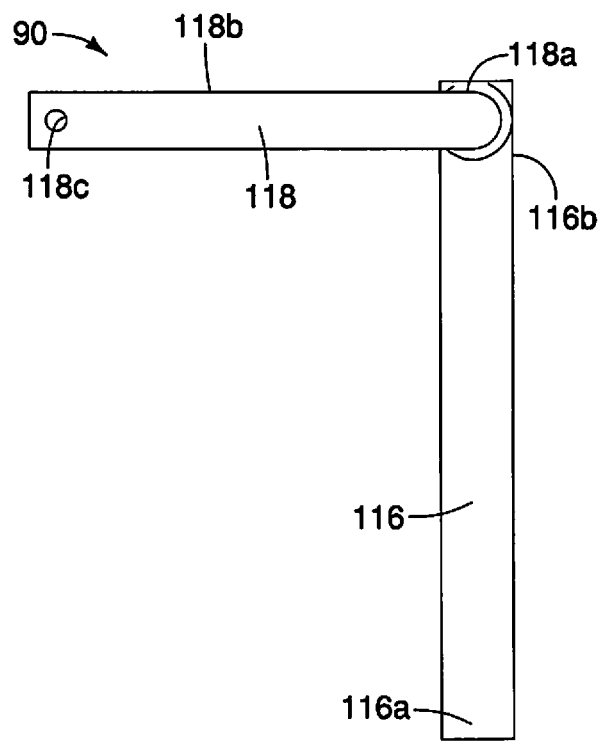
FIG. 49 is a side view of the handle portion of the latch mechanism jig shown removed therefrom in accordance with the depicted embodiment.
Figure 50:
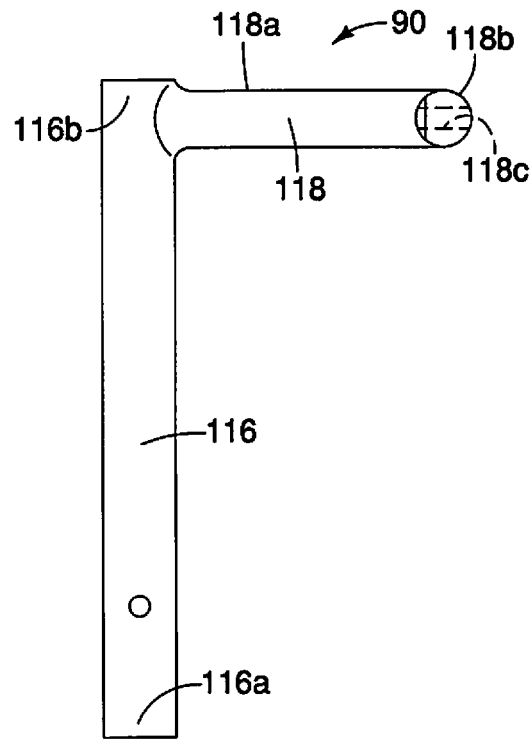
FIG. 50 is a rear view of the handle portion depicted in FIG. 49 shown removed therefrom, showing a lower portion and an upper portion in accordance with the depicted embodiment.
Figure 51:
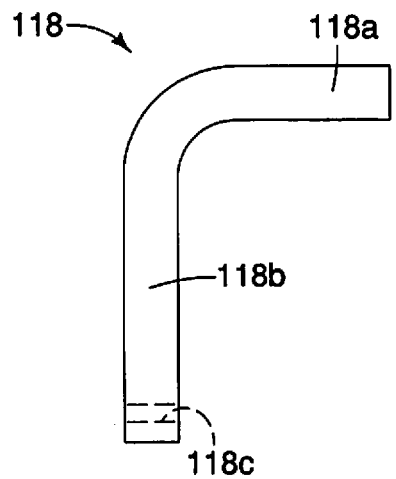
FIG. 51 is a top view of the upper portion of the handle portion in accordance with the depicted embodiment.
Figure 52:
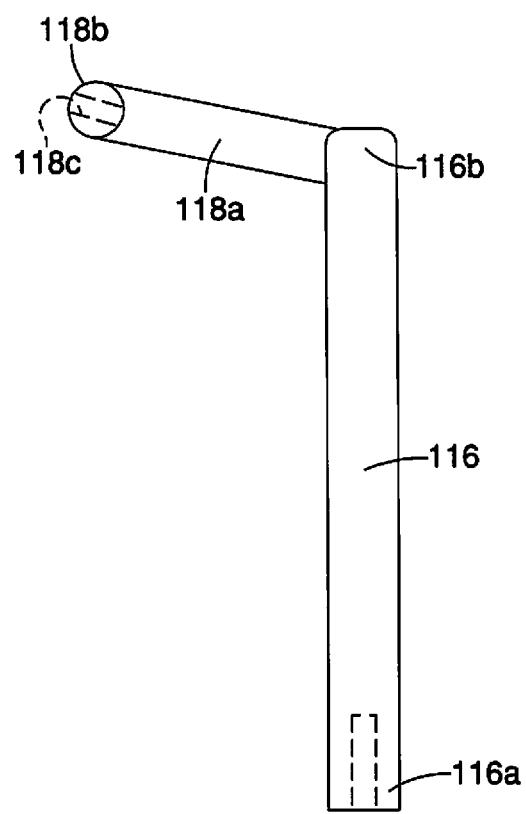
FIG. 52 is a front view of the handle portion of the latch mechanism jig shown removed therefrom in accordance with the depicted embodiment.
Figure 53:
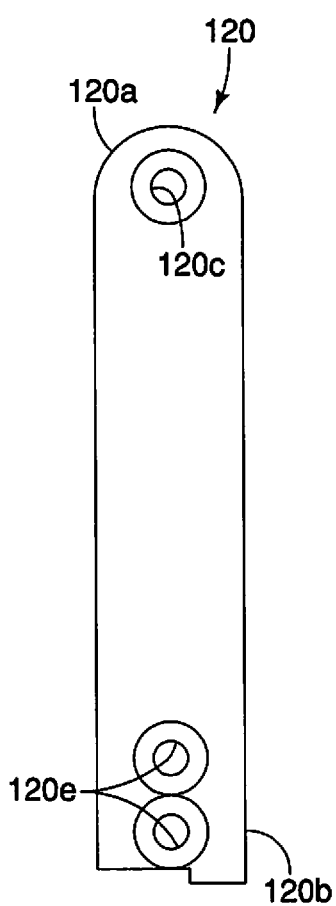
FIG. 53 is a bottom view of a bracket that connects the lower portion of the handle to the frame assembly of the latch mechanism jig in accordance with the depicted embodiment.
Figure 54:
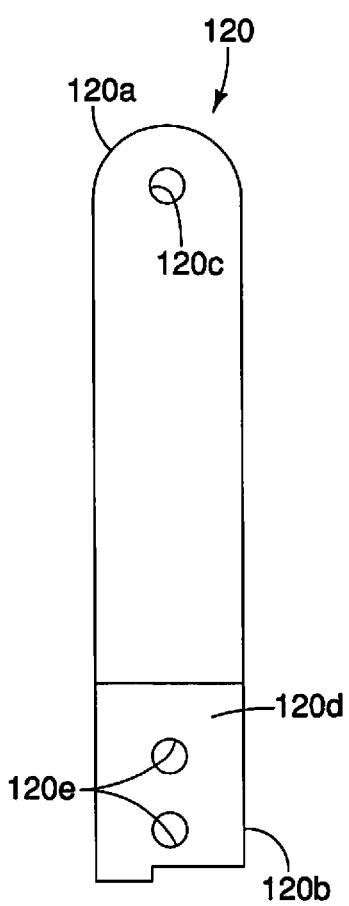
FIG. 54 is a top view of the bracket shown in FIG. 53 in accordance with the depicted embodiment.
Figure 55:
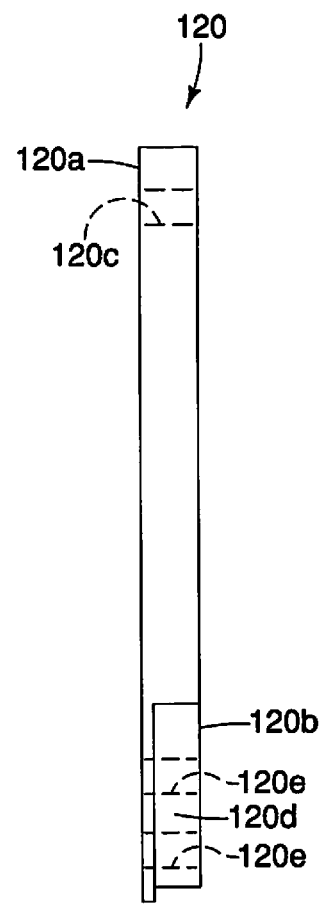
FIG. 55 is a side view of the bracket shown in FIGS. 53 and 54 in accordance with the depicted embodiment.
Figure 56:
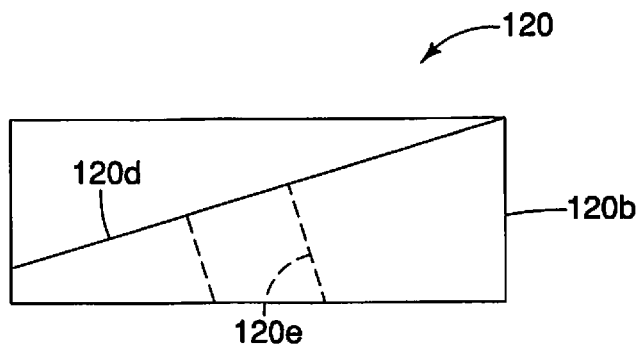
FIG. 56 is an end view of the bracket shown in FIGS. 53, 54 and 55 in accordance with the depicted embodiment.
Figure 59:
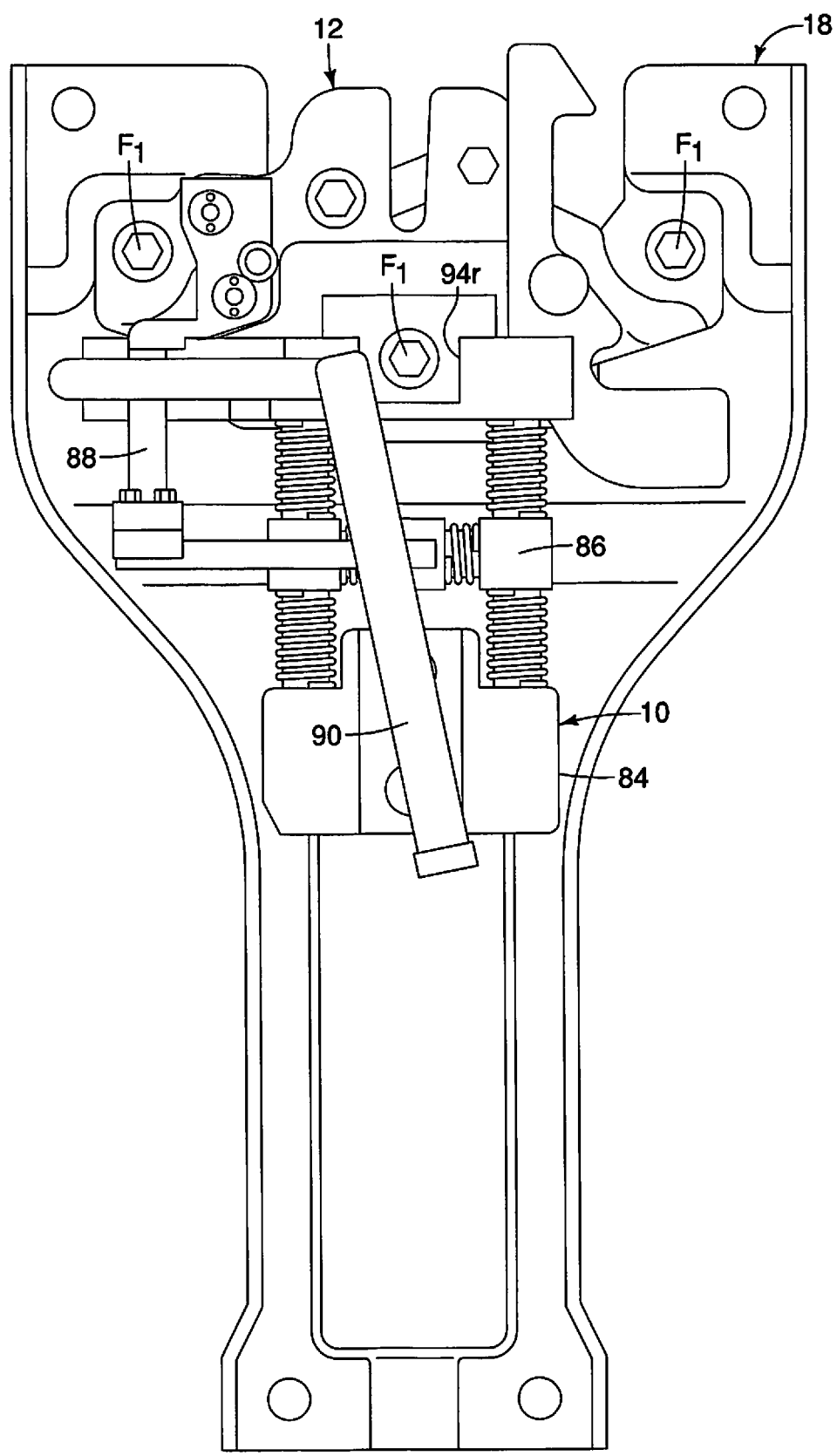
FIG. 59 is another elevational view of the vehicle bracket and the latch mechanism, showing the latch mechanism jig attached to the vehicle bracket and the latch mechanism jig prior to the latch mechanism being moved to an alignment position in accordance with the depicted embodiment.

In the depicted embodiment, the lower portion 116 is a generally straight elongated rod that has a lower end 116*a* that includes an opening that receives a fastener (not shown) that attaches it to the attachment bracket 120. An upper end 116*b* of the lower portion 116 is fixedly attached to the upper portion 118 via a fastener (not shown) or welding techniques, as shown in FIGS. 49, 50 and 52. When installed to the frame assembly 84, the lower portion 116 extends upward, but is inclined relative to a vertical direction (Z direction), as shown in FIGS. 57 and 59.

The upper portion 118 of the handle 90 has a curved portion 118*a* and a straight portion 118*b*. The curved portion 118*a* is welded to the upper end 116*a* of the lower portion 116 and extends away from the upper end 116*b* of the lower portion 116. The straight portion 118*b* extends toward the upper block 94 in a direction perpendicular to the first shafts 96 of the frame assembly 94. An opening 118*c* is provided at a distal end of the straight portion 118*b* such that a fastener (not shown) attaches the handle portion 90 to the upper block 94 of the frame assembly 94.

As shown in FIGS. 53-56, the attachment bracket 120 includes a first end 120a and a second end 120b. The first end 120a includes an opening 120c that receives a fastener (not shown) that fixes the first end 120a to the lower end 116a of the lower portion 116 of the handle portion 90. Alternatively, the attachment bracket 120 can be welded to the lower portion 116.

The second end 120b of the attachment bracket 120 includes an angularly offset recess 120d with two apertures 120e. The surfaces that define the angularly offset recess 120d contacts a lower surface 92d of the lower block 92 of the frame assembly 84 and is fixed thereto by fasteners (not shown) that extend into the openings 92i of the lower surface 92d of the lower block 92 of the frame assembly 84.

The upper portion 118 of the handle portion 90 is fixed to the upper block 94 of the frame assembly 84 as shown in FIGS. 9 and 57. The upper portion 118 can be welded or attached via a mechanical fastener (not shown) to the upper block 94 of the frame assembly 84.

As mentioned above, FIGS. 34-40 demonstrate the relative movements of the carrier assembly 86 relative to the frame assembly 84 (in the Z direction) and the movements of the hood latch supporting assembly 88 relative to the carrier assembly 86 (in the X direction). FIGS. 34-40 show the jig 10 without the springs $S_1$ and $S_2$. When the springs $S_1$ and $S_2$ are installed to the jig 10, the springs $S_1$ substantially center the carrier assembly 86 between the lower and upper blocks 92 and 96 of the frame assembly 84, while the springs $S_2$ substantially center the slider 100 of the hood latch supporting assembly 88 between the shafts 96. Since the springs $S_1$ and $S_2$ are compressible, the hoot latch supporting assembly 88 is movable against the forces of the springs the springs $S_1$ and $S_2$ in the Z direction (vertical direction) and in the X direction (horizontal direction or lateral directions of the vehicle 16).

As shown in FIGS. 57, 58 and 60, the jig 10 is installed to the bracket 18 and the latch mechanism 12 in the following manner. First, the jig 10 is brought into contact with the bracket 18 and the alignment pins $P_1$ are inserted into the first and second alignment openings 70 and 72 of the bracket 18. The magnets $M_1$ are attracted to the magnet receiving areas 74a thru 74d thereby holding the jig 10 to the bracket 18. Simultaneously, the alignment pins $P_2$ and $P_3$ are inserted into the third and fourth alignment openings 76 and 78 of the base plate 50 of the latch mechanism 12. The magnet $M_2$ is attracted to the magnet receiving member 80 thereby holding the jig 10 to the latch mechanism 12.

Thereafter, as shown in FIG. 60, the hood 20 is closed causing the latch striker 14 to engage the latch mechanism 12. Since the striker 14 is rigidly attached to the hood 20, the latch mechanism 12 can be moved by the striker 14 to an alignment position (relative to the striker 14) due to the movement of the carrier assembly 86 relative to the frame assembly 84 (and the bracket 18), and the movement of the hood latch supporting assembly 88 relative to the carrier assembly 86. Hence, once the hood 20 is closed, and the striker 14 engaged with the latch mechanism 12, the fasteners $F_1$ can be tightened to a pre-determined torque thereby fixing the latch mechanism 12 in the alignment position on the bracket 18. The various portions of the jig 10 are dimensioned and shaped such that the fasteners $F_1$ are accessible and/or exposed and are therefore easily tightened, as shown in FIG. 60.

The vehicle 16 includes a variety of vehicle elements and components that are conventional components that are well known in the art. Since these vehicle elements and components are well known in the art, these structures will not be discussed or illustrated in detail herein. Rather, it will be apparent to those skilled in the art from this disclosure that the components can be any type of structure and/or programming that can be used to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the latch mechanism 12 that can be aligned using the latch mechanism jig 10. Accordingly, these terms, as utilized to describe the present invention should be interpreted relative to a vehicle equipped with the latch mechanism 12 that can be aligned using the latch mechanism jig 10.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle latch mechanism jig, comprising:
a frame assembly having at least one first shaft and a vehicle bracket attachment portion;
a carrier assembly having at least one slider and a second shaft, the at least one slider being fitted to the at least one first shaft for movement in a Z-direction along the at least one first shaft, the second shaft perpendicular to the at least one first shaft, the at least one slider and the second shaft being rigidly fixed to one another; and a hood latch supporting assembly having a slider member, an elongated extension member and a latch support portion, the slider member being fitted to the second shaft for movement in an X-axis direction along the second shaft, a first end of the elongated extension member being rigidly fixed to the slider member and the latch support portion being located at a second end of the elongated extension member, the frame assembly being configured such that with the vehicle bracket attachment portion removably attached to a vehicle bracket the latch support portion attaches to a hood latch mechanism that is loosely fitted to the vehicle bracket during alignment of the hood latch mechanism to the vehicle bracket.

2. The vehicle latch mechanism jig according to claim 1, wherein the vehicle bracket attachment portion includes at least one alignment pin and at least one magnet, the at least one alignment pin being dimensioned and positioned for insertion into an opening of the vehicle bracket, and the at least one magnet being located to retain the frame assembly to the vehicle bracket when removably attached to the vehicle bracket.

3. The vehicle latch mechanism jig according to claim 1, wherein the vehicle bracket attachment portion includes a pair of alignment pins and a plurality of magnets, the pair of alignment pins being dimensioned and positioned for insertion into corresponding openings of the vehicle bracket, and the plurality of magnets being located to retain the frame assembly to the vehicle bracket when removably attached to the vehicle bracket.

4. The vehicle latch mechanism jig according to claim 1, wherein the latch support portion of the hood latch supporting assembly includes at least one alignment pin and at least one magnet, the at least one alignment pin being dimensioned and positioned for insertion into an opening of the latch mechanism, and the at least one magnet retaining the hood latch support assembly to the latch mechanism when the frame assembly is removably attached to the vehicle bracket.

5. The vehicle latch mechanism jig according to claim 1, wherein the latch support portion of the hood latch supporting assembly includes a pair of alignment pins and at least one magnet, the pair of alignment pins being dimensioned and positioned for insertion into openings of the latch mechanism, and the at least one magnet retaining the hood latch support assembly to the latch mechanism when the frame assembly is removably attached to the vehicle bracket.

6. The vehicle latch mechanism jig according to claim 1, wherein the at least one first shaft of the frame assembly includes a pair of first shafts spaced apart from one another with the carrier assembly being located therebetween.

7. The vehicle latch mechanism jig according to claim 6, wherein the frame assembly includes an upper block and a lower block, the first shafts each extending from the upper block and the lower block, and, being rigidly fixed to each of the upper block and the lower block.

8. The vehicle latch mechanism jig according to claim 7, wherein the at least one slider of the carrier assembly includes a pair of slider members, one of the pair of slider members being fitted to a first one of the first shafts, and the other of the pair of slider members being fitted to a second one of the first shafts with the second shaft extending between the pairs of slider members.

9. The vehicle latch mechanism jig according to claim 8, wherein the frame assembly includes a first pair of biasing springs installed around the first one of the first shafts located on opposite sides of the one of the pair of slider members, and a second pair of biasing springs installed around the second one of the first shafts located on opposite sides of the other of the pair of slider members such that the first pair of biasing springs and the second pair of biasing springs urge the carrier assembly toward mid-regions of each of the first one and the second one of the first shafts.

10. The vehicle latch mechanism jig according to claim 9, wherein the carrier assembly includes a third pair of biasing springs installed around the second shaft on opposite sides of the slider member urging the slider member toward a mid-region of the second shaft.

11. The vehicle latch mechanism jig according to claim 7, wherein the elongated extension member of the hood latch supporting assembly includes a first part and a second part, the first part being rigidly fixed to the slider member and extending in a direction parallel to the second shaft, the second part rigidly fixed to a distal end of the first part, the second part extending in a direction perpendicular to the first part to an area above the upper block of the frame assembly, with the latch support portion being defined above the upper block.

12. The vehicle latch mechanism jig according to claim 11, wherein the upper block of the frame assembly includes a structure that defines an elongated slot extends parallel to the second shaft of the carrier assembly with the second part of the elongated extension member extending through the elongated slot.

13. The vehicle latch mechanism jig according to claim 12, wherein the latch support portion of the hood latch supporting assembly includes a pair of alignment pins and at least one magnet, the pair of alignment pins being dimensioned and positioned for insertion into openings of the latch mechanism, and the at least one magnet retaining the hood latch support assembly to the latch mechanism when the frame assembly is removably attached to the vehicle bracket.

14. The vehicle latch mechanism jig according to claim 7, wherein the lower block includes a handle supporting bracket rigidly attached thereto and a handle having a lower end rigidly attached to a lower end of the handle supporting bracket and an upper end rigidly attached to the upper block.

15. The vehicle latch mechanism jig according to claim 14, wherein the handle includes a lower portion and an upper portion, the lower portion extending upward from the lower end of the handle supporting bracket and is inclined such that the lower portion of the handle and the at least one first shaft defines an acute angle when viewed from a front side of the frame assembly.

16. The vehicle latch mechanism jig according to claim 15, wherein
the upper portion of the handle extends away from an upper end of the lower portion in a direction perpendicular to the at least one first shaft of the frame assembly.

17. A method for aligning a hood latch mechanism during installation using a latch mechanism jig, comprising:
loosely attaching a latch mechanism to a vehicle bracket forward from an engine compartment of a vehicle;
providing a latch mechanism jig with a frame assembly, a carrier assembly supported to the frame assembly for limited movement in a Z-direction relative to the frame assembly and a hood latch support assembly supported to the carrier assembly for limited movement in an X-direction relative to the frame assembly and the carrier assembly;
removably installing the frame assembly of the latch mechanism jig to the vehicle bracket such that a latch support portion of the hood latch support assembly contacts the latch mechanism;
closing a hood of the vehicle such that a latch striker fixedly and non-movably attached to the hood engages the latch mechanism positioning the latch mechanism relative the vehicle bracket, the latch mechanism jig allowing movement of the latch mechanism relative to the vehicle bracket in both the Z-direction and the X-direction during the closing of the hood;
tightening fasteners supporting the latch mechanism thereby fixing the latch mechanism in position relative to the vehicle bracket; and
removing the latch mechanism jig from the latch mechanism and the vehicle bracket.

\* \* \* \* \*